US009032533B2

(12) United States Patent
Bennett et al.

(10) Patent No.: US 9,032,533 B2
(45) Date of Patent: *May 12, 2015

(54) ENTERPRISE INFORMATION SECURITY MANAGEMENT SOFTWARE FOR PREDICTION MODELING WITH INTERACTIVE GRAPHS

(71) Applicant: Allgress, Inc., Livermore, CA (US)

(72) Inventors: Jeff Bennett, Livermore, CA (US); Mike Stager, Tracy, CA (US); Gordon Shevlin, Livermore, CA (US); William Tang, Arcadia, CA (US)

(73) Assignee: Allgress, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,673

(22) Filed: Aug. 20, 2013

(65) Prior Publication Data

US 2014/0218389 A1    Aug. 7, 2014

Related U.S. Application Data

(62) Division of application No. 12/767,799, filed on Apr. 26, 2010, now Pat. No. 8,516,594.

(60) Provisional application No. 61/172,616, filed on Apr. 24, 2009.

(51) Int. Cl.
*G08B 23/00* (2006.01)
*G06T 11/20* (2006.01)
*G06F 21/57* (2013.01)
*G06T 11/00* (2006.01)

(52) U.S. Cl.
CPC ............ *G06T 11/206* (2013.01); *G06F 21/577* (2013.01); *G06T 11/001* (2013.01)

(58) Field of Classification Search
CPC ............ G06F 21/577; G06F 3/14; G09G 5/02
USPC ............................ 726/25; 345/440, 589, 593
See application file for complete search history.

(56) References Cited

U.S. PATENT DOCUMENTS

| 7,191,435 B2 | 3/2007 | Lau et al. |
| 7,257,630 B2 | 8/2007 | Cole et al. |
| 7,308,712 B2 | 12/2007 | Banzhof |
| 7,324,118 B2 * | 1/2008 | Fujioka et al. ................. 345/589 |
| 7,409,721 B2 | 8/2008 | Hernacki et al. |

(Continued)

FOREIGN PATENT DOCUMENTS

WO    2006125274    11/2006

OTHER PUBLICATIONS

Janne Pyykko, Janne Pyykko's BI Blog, Motion Chart Provided by Google—An Outstanding BI Tool for Free, available at http://jpbi.blogspot.com/2008/03/motion-chart-provided-by-google.html, Mar. 24, 2008 (accessed Aug. 1, 2008).

(Continued)

*Primary Examiner* — Amare F Tabor
(74) *Attorney, Agent, or Firm* — Aka Chan LLP

(57) ABSTRACT

Various baseline security measurements of assets are collected and calculated by the system. A user creates a what-if scenario by changing one or more baseline security measurements. The system generates interactive, animated graphs that compare the baseline security measurements against the what-if scenario.

20 Claims, 15 Drawing Sheets

(56) References Cited

U.S. PATENT DOCUMENTS

| | | | |
|---|---|---|---|
| 7,619,641 B2 * | 11/2009 | Shih et al. | 345/694 |
| 7,800,782 B2 * | 9/2010 | Kanai | 358/1.9 |
| 7,890,869 B1 | 2/2011 | Mayer et al. | |
| 8,095,984 B2 | 1/2012 | McFarlane et al. | |
| 8,122,510 B2 * | 2/2012 | Byers et al. | 726/25 |
| 8,228,375 B2 * | 7/2012 | Liu | 348/51 |
| 8,384,747 B2 * | 2/2013 | Van Berkel | 345/694 |
| 8,401,284 B2 * | 3/2013 | Pettigrew et al. | 382/162 |
| 2003/0009411 A1 | 1/2003 | Ram et al. | |
| 2003/0120576 A1 | 6/2003 | Duckworth | |
| 2004/0006532 A1 | 1/2004 | Lawrence et al. | |
| 2004/0111469 A1 | 6/2004 | Manion et al. | |
| 2006/0149678 A1 | 7/2006 | Malvar et al. | |
| 2007/0067845 A1 | 3/2007 | Wiemer et al. | |
| 2007/0208600 A1 | 9/2007 | Babus et al. | |
| 2008/0154679 A1 | 6/2008 | Wade | |
| 2010/0095158 A1 | 4/2010 | Shah-Hosseini | |

OTHER PUBLICATIONS

Rudolf Van Der Berg, Internet Thought, OECD Broadband Infographic Using Google Motion Chart, available at http://internetthought.blogspot.com/2008/03/oecd-broadband-infographic-using-google.html, Mar. 25, 2008 (accessed Aug. 1, 2008).

Jorge Camoe, Jorge Camoes' Charts, Using Google's Motion Chart to Visualize Population Trends, available at http://charts.jorgecamoes.com/google-motion-chart-api-visualization-population-trends/, Apr. 10, 2008 (accessed Aug. 1, 2008).

Armin Grossenbacher, Tendalyzer Becomes Motion Chart, available at http://blogstats.wordpress.com/2008104/13/trendalyzer-becomes-motion-chart/, Apr. 13, 2008 (accessed Aug. 1, 2008).

* cited by examiner

Figure 7

ENTERPRISE INFORMATION SECURITY MANAGEMENT SOFTWARE FOR PREDICTION MODELING WITH INTERACTIVE GRAPHS

CROSS-REFERENCE TO RELATED APPLICATIONS

This patent application is a divisional of U.S. patent application Ser. No. 12/767,799, filed Apr. 26, 2010, issued as U.S. Pat. No. 8,516,594 on Aug. 20, 2013, which claims the benefit of U.S. provisional patent application 61/172,616, filed Apr. 24, 2009, which are incorporated by reference along with all other references cited in this application.

BACKGROUND OF THE INVENTION

This invention relates to the field of information systems, and more specifically to enterprise information security.

Organizations and enterprises are essentially a collection of assets. An asset is anything that has value to an organization. Assets can range from data files to physical assets. Assets may also include intangibles such as an organization's reputation and the skill sets of its workforce.

These assets include a great deal of information. In many cases, the information is confidential. The information may concern employees, customers, products, research, and financial status. The information may be stored on a variety of media including, for example, disk drives, floppy disks, magnetic disks, optical disks, magneto-optical disks, fixed disks, hard disks, CD-ROMs, recordable CDs, DVDs, recordable DVDs (e.g., hard drives, magnetic disks. The information may also be recorded on paper and stored, for example, binders, folders, and file cabinets.

Protecting such information by ensuring its confidentiality, integrity, and availability is critical to an organization. Security breaches could allow new product lines to fall into the hands of competitors, lost business, law suits, identity theft, and even bankruptcy of the organization.

In many cases, protecting information is not only a business and ethical requirement, but it is also a legal requirement. Regulatory compliance is an important legal responsibility for many organizations. For example, the Sarbanes-Oxley Act (SOX) requires corporate officers to demonstrate the existence of various operational controls. Standard setting bodies such as the International Organization for Standardization (ISO) have extensive policies and procedures to help ensure, for example, regulatory compliance and the safeguard of assets and information.

Managing, securing, and monitoring an organization's assets and ensuring that the organization's policies and procedures comply with regulations can be daunting task. It requires, for example, developing an inventory of assets, defining responsible parties, establishing acceptable use polices, classifying and labeling information, and much more. This can be a very difficult and expensive process.

Therefore, there is a need for an improved system and method of enterprise information security.

BRIEF SUMMARY OF THE INVENTION

Various baseline security measurements of assets are collected and calculated by the system. A user creates a what-if scenario by changing one or more baseline security measurements. The system generates interactive, animated graphs that compare the baseline security measurements against the what-if scenario. This allows the user to perform strategic security analysis and planning A management module allows what-if scenario (e.g., modeling). This feature enables the user to generate security what-if scenarios and models to predict what will happen in the future.

A feature of the module includes security compliance and relationship mapping. This feature includes an animated spider diagram to show the relationships between compliance requirements in one standard against one or more other standards. For example, the system can compare the security requirements for Sarbanes-Oxley versus ISO, HIPPA, PCI, and other security regulatory requirements. This diagram can demonstrate the relationships between IT environment (e.g., servers that host/support an application).

A risk module includes integration of risk modeling with third party tools (e.g., security vulnerability scanners) to generate risk ratings, scores, and percentages. In a specific implementation, the system uses a combination of assessment results (e.g., someone checking the security on a server) and technical assessment results (e.g., third party security scanners) to feed the risk model. A risk formula includes a likelihood and probability calculation. The risk module can gather historical data, current data, or both.

An information security (IT) security software application helps IT managers identify potential security risks in a system. This system can be help assess and remedy network security, to prevent problems involving, for example, unwanted intrusions into the system, authentication failures, viruses, malwares, spoofing, theft of confidential data, denial-of-service attacks, shutting down the network, degrading the network, or other network attacks. For example, sites such as Amazon and eBay run businesses using the Internet. Every second that such a site is down or degraded impacts the amount of sales the company is doing. Further, there is confidential information associated with such sites so that if a user were to obtain a customer list or information like credit info or social security numbers, the sites' users might be subject to attack directly. Also, the sites would lose credibility with their customers on their ability to keep customer information confidential. Therefore, IT security software application is an important tool in managing, identifying, and mitigating network security risks.

Another feature of the risk module is integration with what-if scenario. Once a scenario is built, a risk analysis can be run to determine which scenario is the most risky, costly, and so forth. In a specific implementation, the risk module uses a current risk analysis and integrates future activities (e.g., business expansion into Asia) with potential changes in security risks, costs, vulnerabilities, controls, and the like.

In an implementation, an information technology (IT) security software application permits performing what-if analysis based on factors including current risk analysis and future activities. Given current risk analysis data (from historical or current data), the user inputs future budgets and information about future activities such as expansion into other location, new offices, closing of offices, new software or hardware being deployed, more money being allocated to one location, less money being allocated at another location, and other future factors. This future activities information can be entered into the system as numerical info and given a date. For example, the expected budget for a San Francisco office for each month of a future year can be entered into the system. The IT security will provide charts, reports, and graphs showing and reflecting the potential changes in security risks, costs, vulnerabilities, controls, and others. Many different future inputs are provided to the what-if system (possibly from many different users or many different sources), the system's charts, reports, and graphs make it easier for a user to comprehend the vast amount of input data and to identify potential future security problems (such as seeing changes in an animated graph over time). Based on the what-if analysis, the IT security manager can effect changes to prevent or mitigate the potential future security problems.

Another feature of the module is reporting. An animated report shows risk by business unit or organization and how it changes over time (e.g., trending). In an implementation, an information technology (IT) security software application includes graphics that are animated. An animated graph can includes "play" or "start" button, a "pause" button, and a "stop button." For example, once the play button is indicated, the elements of a graph will move on the computer screen (e.g., tails may be shown or not shown), without further interaction by the user. The user can stop or pause the animated elements. Other controls may include forward, rewind, and multiple speeds for forward and rewind. The graph may also have a timeline, which has an indicator to show at what particular point in time the graph is at. The animated graphs show trends in the quantities of information (e.g., including information about future activities) in a easier to understand format, and make identifying potential future security problems easier. Colors can be used in the animated graphs to highlight features, such as potential problems. Based on the animated changes, an IT security manager can effect changes to prevent or mitigate the potential future security problems.

An asset module includes a spider diagram to show relationships between networks, computers, servers, and applications.

The system calculates various ratios related to risk such as a risk/cost ratio. A risk delta/cost ratio. That is (R2−R1)/cost or risk score 2−risk score 1/cost of X, where X can be an IT project, software, hardware, or the like. The system can show the relationship between changes in risk as a result of security budget/spend, or the changes in risk as a result of changes in security budget, security spending, or both. For example, the IT security software generates a graph showing the relationship between network security risk versus security budget or security spending. This relationship can also be by time in the case a security budget is specified for a time period. For example, the future security budget might be specified month by month such $10K for the first five months, then $12.5K for the next three months, and then $8K for the next month. The system and graphs provided by the system will show the network security risk (e.g., high risk, medium risk, low risk, scores, or index values) versus the changes in security budget. For example, the risk score can change so it is higher risk for the $8K budget month while it is lower for a $12.5K budget month.

Some specific features of the invention include permitting a user to create what-if or hypothetical scenarios related to information security, performing risk analysis with business impacts (e.g., change in risk/change in security budget or spending), and generating management reports and performing trend analysis. The management reports may be interactive reports, displayed on an electronic screen, in which the user can select an object and drill down to see more data, filter the data to see less data, or both.

In a specific implementation, a method includes receiving security assessment information for information technology assets of an organization. The security assessment information is representative of an existing risk exposure of the organization. The method includes presenting the security assessment information to a user for the user to alter, receiving altered security assessment information from the user. The altered security assessment information is representative of a hypothetical risk exposure of the organization. The method includes determining first and second data points, where the first data point is determined using the security assessment information and is representative of the existing risk exposure, and the second data point is determined using the altered security assessment information and is representative of the hypothetical risk exposure, and displaying a graph on an electronic screen and animating a plurality of successive visual representations in the graph. An initial visual representation indicates the first data point, a final visual representation indicates the second data point, and the graph includes a background having a first region having a first color and a second region having a second color, different from the first color.

The background may include a third region having a third color, different from the second and first colors. The visual representations may be bubbles. A line drawn from the initial visual representation to the final visual representation that has a positive slope may indicate an increasing amount of risk.

In an implementation, when the initial visual representation is superimposed over the first region having the first color and the final visual representation is superimposed over the second region having the second color, the organization's risk exposure has increased. In another implementation, when the initial visual representation is superimposed over the second region having the second color and the final visual representation is superimposed over the first region having the first color, the organization's risk exposure has decreased. In a specific implementation, during the animating a plurality of successive visual representations in the graph, the first color of the first region remains constant.

The information technology assets may include at least one of a server, a desktop computer, or a laptop computer.

The receiving security assessment information for information technology assets may include receiving an impact evaluation and a likelihood evaluation for an asset, where the likelihood evaluation indicates a probability of an event occurring and the impact evaluation indicates a degree of disruption to the organization if the event occurs.

The security assessment information may include actual cost expenditures for protecting the information technology assets and the altered security assessment information may include hypothetical cost expenditures for protecting the information technology assets.

In a specific implementation, a method includes in a computer screen, providing a first portion of the screen with a plurality of user-adjustable options, in the computer screen, providing a second portion of the screen with a graph having a first axis, a second axis, and a background comprising a first region having a first color and a second region having a second color, different from the first color. A first shortest distance between the first axis and a first edge of the first region is from the first axis to a leftmost edge of the first region, a second shortest distance between the second axis and a second edge of the first region is from the second axis to a bottommost edge of the first region, and the first region is between the second region and first and second axes, and after a first user-selectable option is selected, animating a first plurality of visual representations in the graph.

In a specific implementation, the leftmost edge of the first region abuts or touches the first axis and the bottommost edge of the first region abuts or touches the second axis. An area of the first region may be greater than an area of the second region. The background may include a third region having a third color, different from the first and second colors. The second region may be between the first and third regions. Each of the first plurality of visual representations may include a circle.

In an implementation, upon a user selecting one of the first plurality of visual representations in the graph, the method includes displaying in the computer screen information associated with the selected visual representation.

In an implementation, the first plurality of visual representations represents assets of a first type and the after a first user-selectable option is selected includes determining whether a filter to filter assets of a second type, different from the first type, has been selected, when it is determined the filter has not been selected, animating a second plurality of visual representations in the graph, where the second plurality of visual representations represents assets of the second type, and when it is determined the filter has been selected, not animating the second plurality of visual representations.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 7 shows a computer screen displaying an application window of another specific implementation of a likelihood matrix.

DETAILED DESCRIPTION OF THE INVENTION

Figure 1:
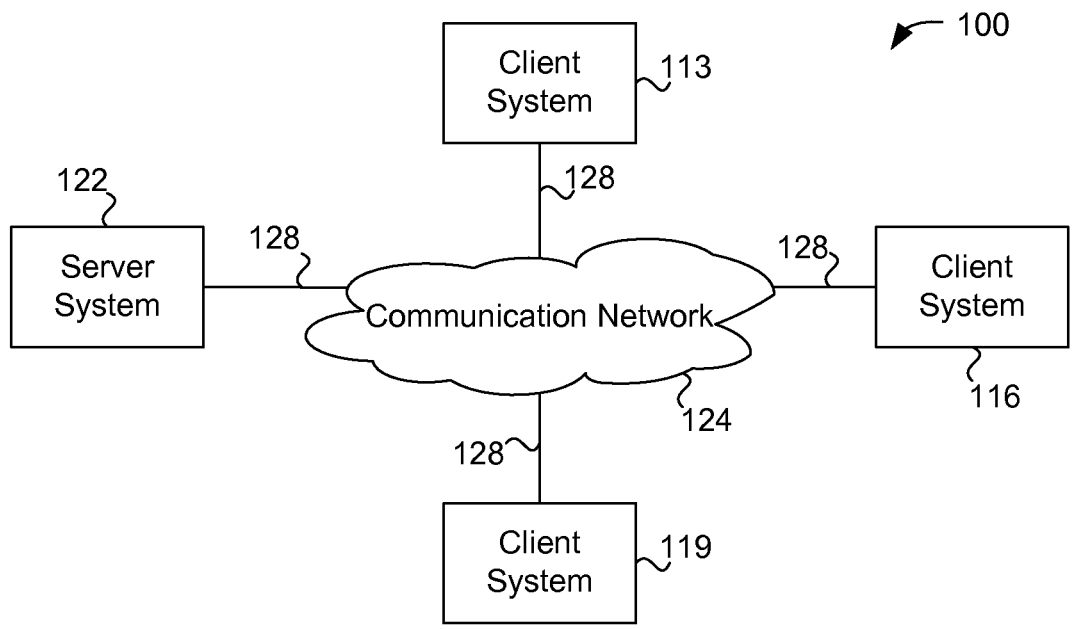
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system. One or modules or tools of the system may be implemented using cloud computing, where users access a tool through a cloud. The tool can be updated in the cloud, and delivered to users through, for example, their web browsers, so users do not need to manually update tool software on their system.

Client systems 113, 116, and 119 typically request information from a server system which provides the information. For this reason, server systems typically have more computing and storage capacity than client systems. However, a particular computer system may act as both a client and a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
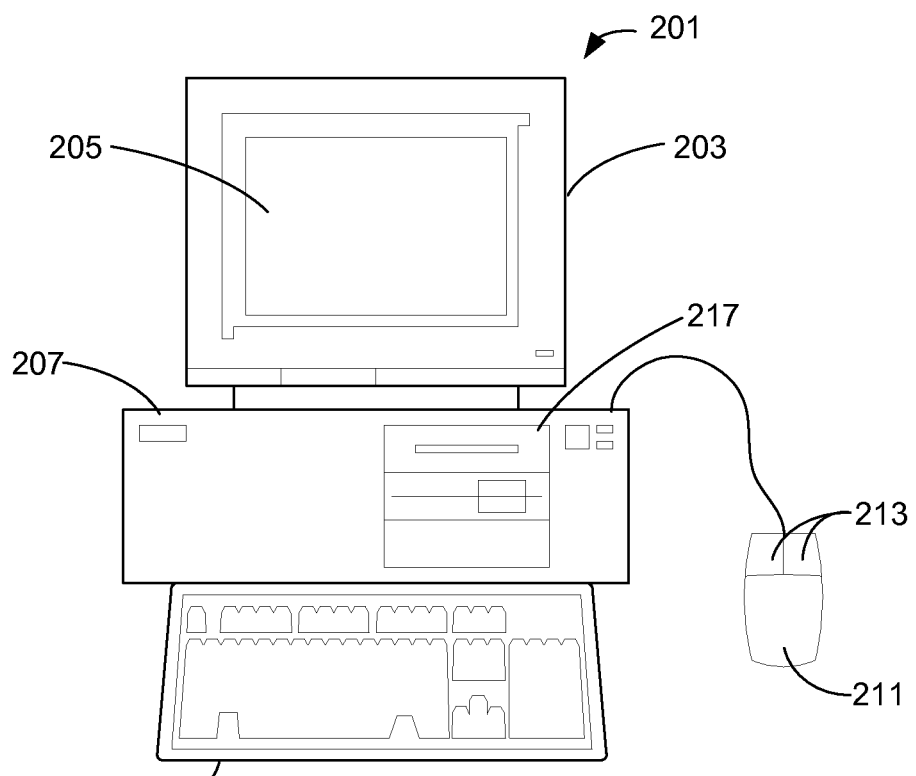
FIG. 2 shows a more detailed diagram of an exemplary client or computer which may be used in an implementation of the invention.

FIG. 2 shows an exemplary client system (or server system) of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version (e.g., a computer program product) of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
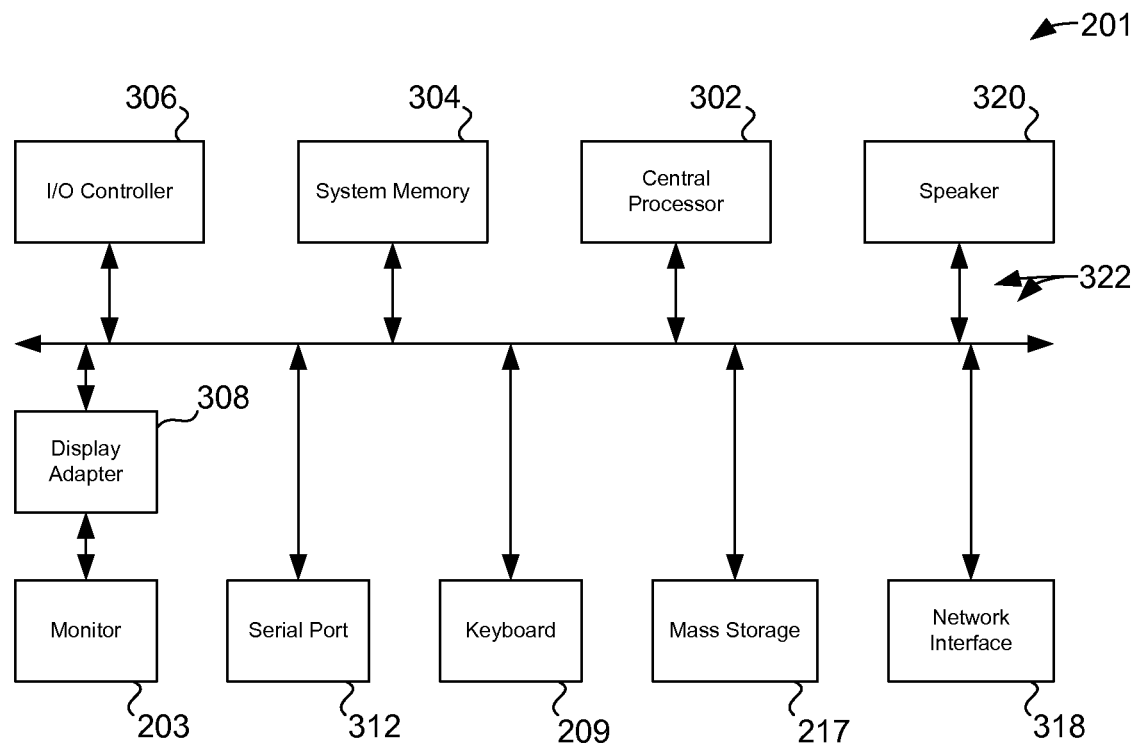
FIG. 3 shows a system block diagram of a client computer system used to execute application programs such as a web browser.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

Figure 4:
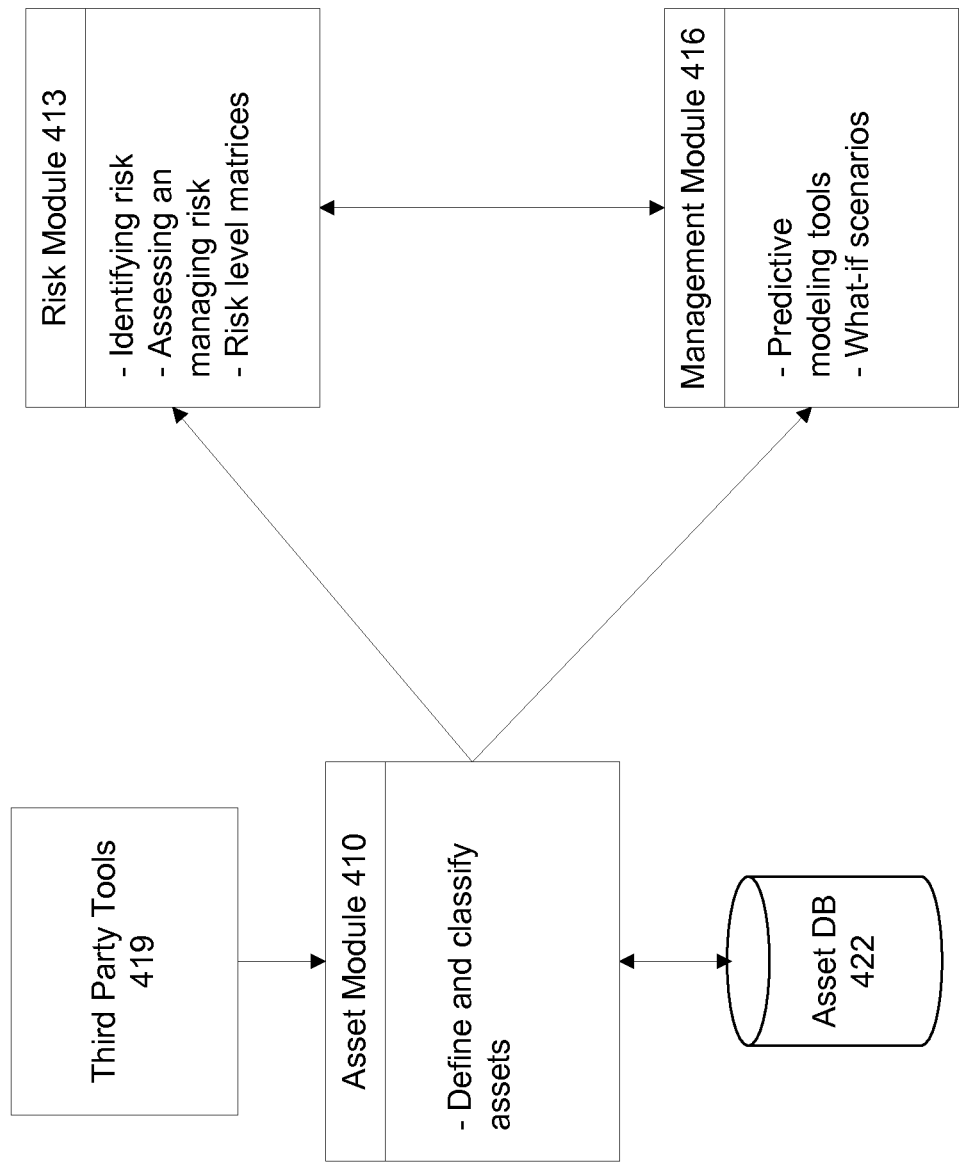
FIG. 4 shows a block diagram of a specific implementation of a system of the invention.

FIG. 4 shows a block diagram of a specific implementation of a system 405 of the invention. The system is an enterprise information security management software tool. This tool allows the user to evaluate security of a particular information system or network, in order to prove return on investment of security projects and activities and perform strategic security analysis and planning.

The tool allows the user to create what-if scenarios for forecasting or modeling. A what-if scenario may be referred to as a hypothetical scenario, i.e., a tentative assumption made in order to draw out and test its consequences. Whereas an actual scenario reflects existing conditions, a hypothetical scenario reflects an assumption or a proposed set of conditions. Comparing an existing or perceived actual scenario against a proposed hypothetical scenario can help with planning, forecasting, and making predictions.

Using the tool, the user can measure the effectiveness of current security controls (e.g., security standards, security regulatory requirements, or industry best practices such as COBIT) and future events such as budget cuts, new business models, or entry into new foreign markets. For example, the user can create a scenario with the assumption that the security budget will be reduced by 20 percent next year. The tool can then provide reports to show the impact of the 20 percent reduction such as the effectiveness of the security controls, risk, and potential impacts to business (e.g., cost, number of breaches, service level agreements for security operations). This information can help the user allocate next year's reduced resources to minimize risk and other security incidents.

The results of the evaluation are provided by interactive graphs on a computer display. These graphs respond to user input (e.g., selected by using a mouse or other pointing device), so the particular information the user desires can be selected and displayed. The graphs also use color, isometric and three-dimensional perspectives, and other graphical elements in order to convey results or a large quantity of information (which also typically varies with time) to the user quickly. The user can quickly see a summary of data and how it changes over time. However, through the software tool, the user is also able to drill down to see the details, if the user so desires. For example, the user can "mouse over" to see some additional detail. Or the user can decide to "click down" on a particular graphical element to see some detail for a subset of the data. Using such an approach, the software tool continues to allow the user to drill down to low levels of detail, if desired.

One or more of the graphs and charts presented to the user can be animated. For example, after the user selects a "play" button, the elements being charted in the graphs will show real-time motion (like a video) that shows the elements changing based on the parameters. The elements are shown in motion on a computer display without further input from the user. For example, when the user indicates there will be a budget decrease at some point in the future, the user can hit "play" and see the change in the graph. The user can see particular changes in the graph, and hit "pause" or "stop" to stop the animation. Then the user can investigate the graph further and the parameters to cause the animation to appear as it did. The user can continue the animation, or can rewind or forward the animation to any point in time as desired. Animated graphs help show trends and changes, and rates of change, more clearly to the user.

In one implementation, the system is available to users as an online application, such as the user accesses the application by logging in through a Web browser interface. Through a login interface, the online application can include access controls (e.g., passwords and encryption) that the user has to login through, before the user can access the application. The application may be written using a platform-independent language or environment such as Java, Javascript, AJAX, Adobe Flash, Adobe Shockwave, or Microsoft Silverlight, so that the application will run on a browser on any platform such as Windows, Mac OS X, UNIX, Linux, or Sun OS. In a specific implementation, the application is written using Microsoft Silverlight and is platform-independent from the client side.

In another implementation, the system is available to users as a desktop application. The desktop application is downloaded (or provided via a CD-ROM, DVD, or other storage device) and then installed on a computer. Compared to the online application, the desktop may not be platform independent, but may be customized to characteristics of a particular platform. So, such a customized application may be faster because it is optimized to run on particular hardware (e.g., specific graphics hardware, or dual displays).

In an implementation, in contrast to an installed desktop application, the system is a cloud-based system, where the applications are served over a network. The maintenance of the software is handled remotely from the desktop machine. When new versions of any module of the software are available, these updated modules are received from the cloud as needed. The software will be delivered to the client machine based on demand. For example, the software of the invention may be implemented using AJAX or similar language and executed in, for example, a browser application.

In FIG. 4, the system includes three modules and a database or repository. These modules can be implemented using software code, or in hardware, such as by firmware, or a combination or software and hardware. Some specific modules are shown, but a system may include a subset of the modules shown or additionally other modules (not shown). Also, some modules may be combined with other modules shown or different modules; for example, the risk module may be combined with the management module. Other modules that may be included with the system are described in U.S. patent application Ser. No. 12/420,818, filed Apr. 8, 2009, which is incorporated by reference along with all other references cited in this application.

Referring to FIG. 4, there is an asset module 410, a risk module 413, and a management module 416. Asset information from third party tools 419 can be feed into the asset module. The asset information is then stored in an asset database 422.

There are arrows between the modules and database. These arrows represent data pathways between the modules, so one module can pass data from one module to another module or from a module to a database, and vice versa. The data paths may be across a network (such as Ethernet or the Internet) or may be within a single computing machine or server, such as across buses or memory-to-memory or memory-to-hard-disk transfer. The data paths can also be representative of a module, being implemented as a subroutine, passing data in a data structure (e.g., variable, array, pointers, or other) to another module, which may be also implemented as a subroutine.

The modules represent how data and data processing procedures are organized in a specific system implementation, which facilitates the reporting and other features of the invention in an efficient and organized manner. Data can more quickly be accessed and drawn on the screen. System response time is fast and the user does not have to do a lot of repetition to obtain the results the user desires.

Assets are defined and classified in the asset module. Some examples of assets include servers, files servers, virtual file servers, Web servers, application servers, database servers, any file-based or nonfile document repositories, storage devices, network attached storage (NAS) devices, desktop computers, laptop computers, routers, network devices, modems, personal digital assistants (PDA), tablet computers (e.g., iPad from Apple Inc.), smartphones, thin clients, software, productivity software (e.g., word processing program, spreadsheet program, and presentation programs), computer aided design (CAD) programs, graphic design programs, database programs, software systems (e.g., enterprise resource planning (ERP) systems, supply chain management (SRM) systems, customer relationship management (CRM) systems), employees, documents (e.g., confidential documents), writings, notes, memoranda, recorded audio, recorded video, pictures, photographs, buildings, laboratories, vehicles, work products of the organization (e.g., manufactured goods, prototypes, samples, clothing samples, materials, or test samples), or anything of value to the organization.

In a specific implementation, an asset is defined by identifying its host name, IP address, location (e.g., geographical location), asset type, business unit, department (e.g., sales, accounting, marketing, development), network, subnet (e.g., by IP range), operating system, application type (e.g., business application, financial application, network application, or network utility), custodian, owner, or combinations of these. The asset module includes an import feature so that lists or tables of asset information can be imported from third party tools. The asset information may be automatically pushed, pulled, or both via a web interface or data feed (e.g., XML data feed).

Assets are classified based on their value or importance to the company. There can be any number of classifications. These classifications can be defined or programmed by the user. In a specific implementation, an asset can be classified as high, medium, or low.

The risk module includes a risk management framework for identifying and assessing or managing risks. The risk module then generates reports including risk ratings, scores, and percentages. In a specific implementation, a report includes a risk level matrix. The risk level matrix is an interactive graph having visual representations or indicators such as colors representing different levels of risk, severity, or likelihoods. The user can click on the graph to drill down and see additional detail underlying the risk calculations of the risk formula. The user can then take steps to reduce risk to a desired level.

In brief, a risk analysis flow or process of the risk module includes:
1. Input or collection of asset information
2. Controls analysis
3. Vulnerability analysis
4. Likelihood determination
5. Impact determination
6. Risk determination
7. Outputs including risk heat map, quantitative risk exposure score, risk to cost ratio, and risk delta or change to cost ratio.

The input of asset information includes inputting into the risk module information from the asset module (e.g., technical scans, vulnerabilities, and asset classifications). The user can select a subset of information from the asset module to include in the risk analysis. For example, the user can select any number of specific business units, subnets, assets, or combinations of these to include in a risk analysis.

In the controls analysis step the user selects any number of security assessments (i.e., assessment projects) from the assessment module to include in the risk analysis. Generally, the scope of the risk analysis is determined by the assessment projects and results that are selected. In a specific implementation, the risk analysis is based on a selected assessment scoring methodology or baseline score. An example of an assessment score methodology is the capability maturity model (CMM). CMM includes five levels numbered 1 to 5 to indicate the predictability, effectiveness, and control of an organization's processes.

This control analysis step establishes the scope of the risk analysis, the relationship between the assets involved, the involved assets' classification, and the assessment control scores related to the involved assets.

In the vulnerability analysis step, the user selects a set of technical scans from a list of technical scans. In a specific implementation, the system displays the technical scans associated with the involved or selected assets. Technical scans associated with other assets are not displayed.

In a specific implementation, the system uses the National Institute of Standards and Technology (NIST) Common Vulnerability Scoring System (CVSS). CVSS describes an open framework for communicating the characteristics of information technology vulnerabilities. This quantitative model ensures repeatable accurate measurement while enabling users to see the underlying vulnerability characteristics that were used to generate the scores.

Likelihood is defined as the probability of an event or occurrence (e.g., the probability of an adverse event). Some examples of events include the asset being infected with malware (e.g., (e.g., destructive virus attacks, spyware attacks, adware attacks, botnet code infections, and hacker tool infections), theft of the asset, accidental destruction of the asset (e.g., flood or fire). In a specific implementation, there are three levels of likelihood including high, medium, and low. As an example, the likelihood that server A will be infected with malware is medium. In this example, the asset is server A. The event is server A infected with malware.

Specifically, in the likelihood determination step, the system maps the assessment results (e.g., assessment of controls based on CoBIT or other standards) against the severity of the technical scans (e.g., Qualys vulnerabilities) to determine a likelihood score or measurement. Any method may be used to calculate likelihoods. The system includes one or more default likelihood calculation methods (e.g., average and worst case). In a specific implementation, the likelihood calculation method can be customized or programmed by the user. That is, users can use their own risk analysis calculation, risk analysis methodology, or both, and import the results into the reporting features of the system.

The system calculates an initial likelihood which is displayed as a likelihood matrix graph (i.e., likelihood heat map). The values of the matrix can be overridden by the user. In this specific implementation, overall likelihood rating is defined as the probability of an exploitable vulnerability versus the existence of preventative controls. The likelihood tolerance can be user configurable.

The likelihood matrix is dynamic. The axes of the matrix change to reflect the issue score set or selected by the user. Similarly, the high, medium, and low likelihood thresholds can be configured by the user.

Furthermore, the user can drill down into a specific business unit, subnet, or individual asset to modify the likelihood score.

The impact determination step includes determining the effect, consequences, or magnitude of an event if the event occurs. In the server A example described above, the impact of server A becoming infected with malware may be high. Server A may perform services that are very important to the organization such as handling financial transactions (e.g., online sales or placing order for the purchase of stock). Thus, if server A fails customers will not be able to make online purchases and the company will loose revenue.

In particular, if the user desires to separate impact scores from the traditional asset classification, then this step enables the user to make the appropriate changes. In this specific implementation, the system assumes the impact (e.g., financial loss, system mission, data criticality, and data sensitivity) associated with an asset is the same as the security classification. This simplification can help introduce users to formal risk analysis methodologies. In this specific implementation, the magnitude of impact qualitative categories include high, medium, and low.

In the risk determination step, the system determines the risk score per asset and averages them by business unit for an overall risk ranking. The risk score is calculated by multiplying the likelihood and impact scores (i.e., risk=impact×likelihood). Thus, risk is measured with respect to the impact of an event and the likelihood of the event.

High, medium, and low risk scores are defined by numerical ranges and are customizable by the user. Similar to the likelihood and impact scores, the user may override the risk scores. For example, if the risk analysis results in an asset having a medium risk, the user may manually override the medium to a high or vice versa. The system can track and document (or record) all override scores and any user comments.

The management module provides metrics integration, predictive modeling tools, and business intelligence reporting. Metrics includes tools to gather the business metrics (e.g., cost, time spent) and security metrics (e.g., number of vulnerabilities, risk calculations) from the asset, assessment, prioritize, and mitigate modules into meaningful management reports and graphs. The graphs current gap analysis, trending, and animated graphs using business metrics (e.g., cost of controls or incidents by ISO security domains). The system can link security to business such as linking security costs, risks, spending, and analysis to business decisions and operations (e.g., reducing X amount of risk, costs us Y dollars).

Examples of business metrics include measurement of the effectiveness of a security program; return on security investment; measurement of key risk indicators such as trending of open security issues over time; number or trending of information security breaches; status of key security programs in process; measurements of security operations such as cost of implementing a firewall; hourly cost of a consultant; calendar time to patch a server; or effort (e.g., days or hours) to perform an audit. The system can display interactive reports to show trending and changes. An interactive report may include one or more filters to see a specific business, unit, platform type, asset type, and so forth.

Other examples of business metrics that the system may calculate, store, or both include capital expenditure, operations and maintenance expenditure, time to complete (i.e., number of calendar days between task assignment and completion), labor cost (e.g., consultant cost and full-time employee (FTE) cost). The user can add customized fields such as accounting numbers instead of using the default capital expenditures or operations and maintenance fields. Typically, business metrics are used by executives.

Examples of security metrics include measurements of security results and analysis (e.g., risk ratings and weights, number of security incidents, number of computer viruses, and potential loss expectancy). Any number of variables, weights, and calculations for assessing risk may also be included in this definition. In a specific implementation, single or annual loss expectancy is included in security metrics, not in the business metrics. Other examples include key performance indicators, key risk indicators, asset classification, number of vulnerabilities, and risk rating. The risk rating may be referred to as the quantitative risk exposure score. In a specific implementation, the quantitative risk exposure score is based on input from technical scans and input from asset classifications. Typically, security metrics are used by information security managers.

Another example of a metric that the management module may calculate, store, or both is a risk to cost ratio. For example, costs such as IT costs and security budgets can be inputted into the system. The system uses the costs and risks to calculate and display in a report the risk to cost ratio. The risk to cost ratio indicates the risk per dollar of investment. Such a ratio can be used to help show risk security return on investment or prove security return on investment.

The modeling tools enable the user to generate what-if scenarios and models to predict what will happen in the future. The user can override existing security data such as asset classification, vulnerabilities, and assessment score to generate what-if scenarios for risk calculations. The system generates flexible, intuitive reports with heat maps of risk calculations and "what-if" scenarios based on actual security data, modified security data, or both.

In a specific implementation, the management module can be integrated with a company's existing governance, risk, and compliance (GRC) application.

Table A below shows a specific flow for using some of the predictive modeling tools of the management module.

TABLE A

| Step | Description |
|---|---|
| 1 | User enters or selects a security control framework. Some examples of a security control framework include ISO, CoBIT, PCI, or other industry standard or compliance requirement. |
| 2 | User identifies current activities, future activities, or forces, or combinations of these that impact the security control framework and lifecycle. Some examples of forces include budget cuts, new computer viruses, changes to regulatory requirements, or changes to the IT environment. |
| 3 | User changes the effectiveness of the security controls based on the forces' impact. For example, the current effectiveness may be obtained from the results entered in the Assessment Module and a budget cut may reduce the score from 3 to 2. |
| 4 | System displays historical security and business metrics for that security control. User can revise the security control with the new assumptions. For example, when the user changes the score (step 3) the user can see the number of past incidents and forecast that there will be an increase in the number of incidents in the future (e.g. impact/result, cause/effect analysis). |
| 6 | System displays a management report including graphs and the what-if scenarios. |
| 7 | System provides the user with a virtual or sandbox environment for evaluating the elimination or reduction in security control streams. For example, user can see what will happen to the risk profile or risk exposure of the company if specific security controls are eliminated. This helps the user to understand the impact on the risk profile due to changes in preventive or detective controls. |

It should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

The business intelligence and reporting features of the management module include visual reports that summarize assessment results, mitigation tasks, status, costs, and other information. These graphs and reports are interactive and allow the user to "drill down," filter, print, and other like functions.

The user can change the variables to be graphed including the x- and y-axis. For example, in the gap comparison chart, features include measuring gaps in terms of desired scores (e.g., compliant, non-compliant) with security standards, modifying the graph so that it represents other criteria such as risk versus risk tolerance, actual budget spend versus estimated (e.g., by capital, operating and maintenance, or other customized accounting "buckets"), and vulnerabilities by type.

Furthermore, in various animated charts, the y-axis of asset classification can be replaced with risk or vulnerabilities from technical scans. The x-axis can be replaced with mitigation costs or other variables. The user can to define the axis by a drop down menu of security criteria.

IT related risk may be defined as impact to mission systems due to the probability that a particular threat-source will exploit a particular information system's vulnerability resulting in unauthorized disclosure, modification or destruction of information, errors and omissions, and disruptions to operations.

Risk assessment may be defined as the process of identifying the risk to system security and determining the probability of occurrence, the resulting impact, and additional safeguards that would mitigate this impact.

Risk management may be defined as the process of identifying, controlling, and mitigating information system related risks.

Vulnerability may be defined as a flaw or weakness in system security procedure, design, implementation, or internal controls that could be exercised, and result in a security breach or a violation of the system's security policy.

Figure 5:
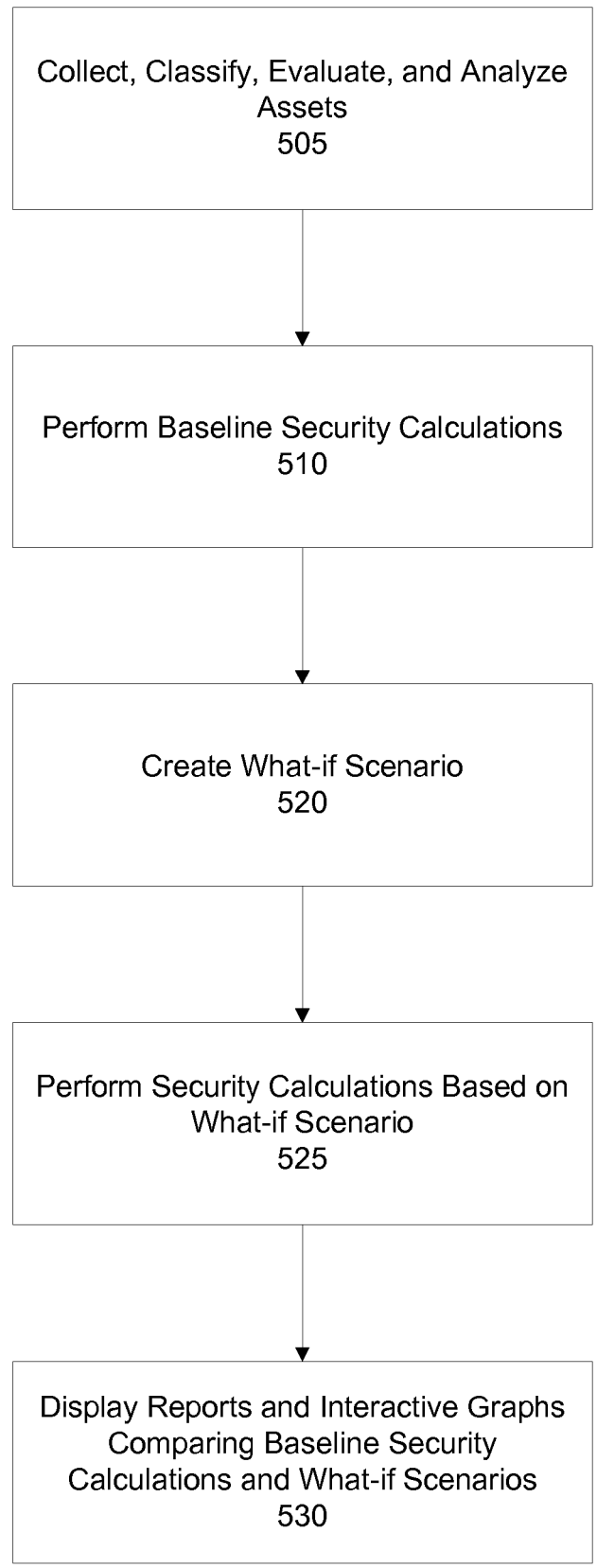
FIG. 5 shows a specific implementation of a flow diagram for security forecasting.

FIG. 5 shows a specific implementation of a flow diagram for security forecasting. In a step 505, the user uses the system to collect, classify, evaluate, and analyze assets. An asset or the procedures used to protect the asset are evaluated against one or more security standards developed by such bodies as the International Organization for Standardization (ISO), International Electrotechnical Commission (IEC), Information Systems Audit and Control Association (ISACA), IT Governance Institute (ITGI), National Institute of Standards and Technology (NIST), North American Electric Reliability Corporation (NERC), Information Security and Privacy Advisory Board, (ISPAB), and PCI Security Standards Council.

As an example, a first asset may be a server. The user assigns the server a classification value (e.g., high, medium, or low). The user evaluates the current security procedures used to protect the server. The evaluation is performed by comparing the procedures outlined in a specific standard with the current procedures. The user inputs into the system a security maturity score (e.g., assessment score) based on the comparison.

Analyzing security risks to the server may include determining a likelihood of an event occurring to the server and an impact rating if the event were to occur.

The event can be anything that would compromise the server (e.g., server infected with malware). In a specific implementation, the likelihood is determined based on a vulnerability scan. The vulnerability scan is used to detect potential vulnerabilities of the server. For example, the vulnerability scan can check whether or not a specific software patch or update has been implemented or installed on the server, whether or not the server is password protected, the strength of the password protecting the server, and so forth. This information is used to assign a likelihood probability to the server. For example, if no software patches have been installed on server there is a high likelihood of the event occurring. If all the current software patches have been installed there is a low likelihood of the event occurring.

In a specific implementation, the system equates the impact rating to the server's classification value. The user can change the impact rating. The impact rating is a measurement of the consequences of the event occurring. For example, if the server performs services that are critical to the daily operations of the company the impact rating of the server will be high. If the server is simply a backup server the impact rating of the server may be medium or low.

Table B below summarizes some of the information or parameters from step 505.

TABLE B

| Asset | Standard | Classification | Maturity Score | Likelihood | Impact |
|---|---|---|---|---|---|
| Server | ISO | High | 4 | Low | High |

In a step 510, the system performs baseline or actual security calculations. In a specific implementation, the security calculations include determining a risk score (e.g., quantitative risk exposure score) of the asset. A risk score formula includes multiplying the likelihood of the event by the impact of the event occurring. For example, an asset having a low likelihood and a low impact would have a low risk score. Generally, low risk scores are desirable. In another case, an asset having a high likelihood and a high impact would have a high risk score. Generally, high risk scores are undesirable.

Table C below shows an updated version of table B with the risk score of the asset having been calculated. The risk score is shown in the last column of table C.

TABLE C

| Asset | Standard | Classification | Maturity Score | Likelihood | Impact | Risk |
|---|---|---|---|---|---|---|
| Server | ISO | High | 4 | Low | High | Low |

In this example, the risk for the first asset (i.e., server) is low. Thus, although the server has a high impact value, the server has a low likelihood value—perhaps because resources are expended to ensure that software patches are current. These parameter values may be referred to as baseline or actual values.

In a step 520, the user creates a what-if scenario or analysis. Using the what-if scenario feature, the user can change one or more variables (e.g., assessment score) and see how that change will affect risk. The what-if scenario can include any number of assets and any number of parameters to be inputted, edited, altered, modified, or changed by the user. Some examples of parameters than can be edited include maturity scores or assessment scores, likelihoods, impacts, classifications, costs, vulnerabilities, risks, regulatory requirements, threats, activities, and the like. The parameters can include information captured by any module of the system, information from sources external to the system, or both.

The user can create any number of what-if scenarios. The system then saves or stores these scenarios or scenario files (e.g., save on server or save on client).

For example, the user can create a first scenario including the first asset (or server) in the example above. In a specific implementation, the user creates the first scenario by clicking a button. The user inputs a name for the first scenario (e.g., year 1 budget, year 2 budget, proposed July budget, proposed regulatory requirement, and so forth). As an example, the user assumes that in the first scenario there are budget cuts. The user wishes to see how the proposed budget cuts will impact the risk exposure of the company.

In particular, the budget cuts can affect one or more parameters of the server. For example, there may no longer be any resources to ensure that security patches on the server are current.

As part of the first scenario, the user changes, tweaks, or overrides the security maturity or assessment score of the server to reflect the fact that fewer resources will be available to maintain the security of the server. This increases the likelihood of the event occurring, i.e., server infected with malware.

Table D below shows the parameters from table B above with the maturity score having been changed by the user highlighted.

TABLE D

| Asset | Standard | Classification | Maturity Score | Likelihood | Impact |
|---|---|---|---|---|---|
| Server | ISO | High | 2 | High | High |

For each what-if scenario the system tracks the changes made to the various parameters. This allows the user to undo the change to revert to the earlier value. Generally, the changes are highlighted so the user can quickly identify which value was changed. For example, the user can open a what-if scenario stored on the system. The what-if scenario displays various assets included in the what-if scenario, security standards, values, parameters, and so forth. Any changes to the values (e.g., changes from an actual value) are highlighted. This allows the user to quickly see which values were changed. Any type of highlight may be used (e.g., colors).

In a specific implementation, the actual value is displayed in a first color (e.g., yellow). The changed or tweaked value is displayed in a second color (e.g., green) if the changed value indicates an increase or improvement over the actual value. The changed value is displayed in a third color (e.g., red) if the changed value indicates a decrease over the actual value.

Furthermore, in various implementations, the user can click the changed value and the system will respond by displaying the actual value. That is, the user can toggle between a view showing the changed value and a view showing the actual value. In another implementation, a view includes both the actual value and the changed value. The user can hover over the changed value and the system responds by displaying the actual value in a bubble and vice versa. The system allows the user to record notes or comments on why a particular value or score was changed.

The system provides various techniques for users to change the various parameters. One or more parameter values may be changed based on a single change. For example, in a specific implementation, a set of parameters is organized hierarchically as a graphical folder tree. The folder tree can be collapsed and expanded by toggling plus and minus icons adjacent to the different folders or levels.

In a specific implementation, the hierarchy includes first level parameters (e.g., domain), second level parameters (e.g., subdomain) below a first level parameter, and third level parameters (e.g., components or tasks) below a second level parameter. The user can change or override a first level parameter and the change will propagate to the second and third level parameters. The user can change a second level parameter and the change will propagate to the third level parameters.

In this specific implementation, the domain, subdomains, and tasks are associated with assessment scores. The assessment score of a subdomain can be an average of the assessment scores assigned to the tasks of the subdomain. As an example, to quickly change the assessment score for each task in the subdomain, the user toggles the plus and minus icons adjacent to the subdomain to collapse the subdomain. The user clicks on the subdomain. A dialog box pops-up. The dialog box displays the actual assessment score of the subdomain and a box to input a changed assessment score. The user inputs the changed assessment score and clicks a submit button. The system then changes each of the assessment scores of the tasks in the subdomain to the changed assessment score.

As another example, to change assessment scores for specific tasks in a subdomain, the user toggles the plus and minus icons adjacent to the subdomain to expand the subdomain to show the tasks in the subdomain. The user selects a specific task by clicking on it. A dialog box pops-up. The dialog box displays the actual assessment score assigned to the task and a box to input a changed assessment score. The user inputs the changed assessment score and clicks a submit button. The system then changes the assessment score for the selected task in the subdomain.

In a step 525, the system performs security calculations based on the what-if scenario. For example, in a specific implementation, the security calculation includes determining a risk score using the risk score formula described in step 510. Table E below shows the parameters from table D above, but now includes a recalculated risk score.

TABLE E

| Asset | Standard | Classification | Maturity Score | Likelihood | Impact | Risk |
|---|---|---|---|---|---|---|
| Server | ISO | High | 2 | High | High | High |

As shown in table E, the risk score has changed from low (table C) to high. In this example, the increase in the risk score is due to the budget cut, which resulted in fewer resources to protect the server, which in turn resulted in a low maturity score, and which in turn resulted in a high likelihood that the server will be infected with malware. In this example, the server continues to perform critical services and thus the impact of the server being infected with malware is high. A high likelihood and a high impact produces a high risk.

In a step 530, the system generates and displays reports and interactive graphs. These interactive graphs can compare the baseline security calculations to one or more what-if scenarios. The interactive graphs can compare one what-if scenario to another what-if scenario. For example, the user can compare a first what-if scenario against a second what-if scenario. The system can highlight the differences between the compared scenarios. In a specific implementation, these interactive graphs include animation to show the changes between a baseline scenario and a what-if scenario. For example, the animation can show how the risk exposure of a business unit will change if there are security budget cuts.

These comparisons can be used to show or predict the potential impacts of budget cuts, new regulatory requirements, new security requirements, new threats, and so forth. The system can show trending between two or more scenarios. These interactive graphs summarize the baseline and changed security calculations that may have been performed for hundreds, thousands, tens of thousands, hundreds of thousands, or millions of assets. An example of an interactive graph is the animated risk heat map bubble chart shown in FIGS. 10 and 12.

In a specific implementation, the system performs a risk analysis with business impacts. For example, based on a change in security budget or security spending, the system analyzes changes in risk. In a specific implementation, a flow for analyzing hypothetical risk exposure levels includes:

1. Receiving security assessment information for information technology assets of an organization. The security assessment information is representative of an existing risk exposure of the organization.

2. Presenting the security assessment information to a user for the user to alter.

3. Receiving altered security assessment information from the user. The altered security assessment information is representative of a hypothetical risk exposure of the organization.

4. Determining first and second data points. The first data point is determined using the security assessment information and is representative of the existing risk exposure. The second data point is determined using the altered security assessment information and is representative of the hypothetical risk exposure.

5. Displaying a graph on an electronic screen and animating a plurality of successive visual representations in the graph. An initial visual representation indicates the first data point. A final visual representation indicates the second data point. The graph includes a background including a first region having a first color and a second region having a second color, different from the first color.

In step 1 above, the security assessment information may include existing or actual cost information expended to protect the assets (e.g., information technology employee salaries, administrative costs, costs of performing security upgrades, costs to rent secure data centers, and so forth). The security assessment information may include classifications assigned to the assets, likelihood assessments, and risk scores.

In step 2, the user may alter the existing security assessment information such as changing the cost expended to protect the assets, changing an asset's classification, changing likelihood assessments, changing risk scores, or combinations of these.

In step 3, the altered security assessment information is received at a server of the systems and stored (e.g., stored in a database or memory device of the system). Altered security assessment information represents the hypothetical or what-if scenario.

In step 4, the first data point is calculated based on the security assessment information. The second data point is calculated based on the altered security assessment information. The calculations may include multiplying classification or impact evaluations with likelihood evaluations to generate risk scores, summing the risk scores of the assets, and calculating averages.

In step 5, the system graphs or animates a set of visual representations or bubbles on a graph that represents the first and second data points. The graph includes a background having demarcated regions. The regions represent a level of risk. A region may be color-coded to indicate the level of risk the region represents. The user can identify the level of risk of the hypothetical scenario by seeing what region on the graph the bubble appears or is superimposed over.

Figure 6:
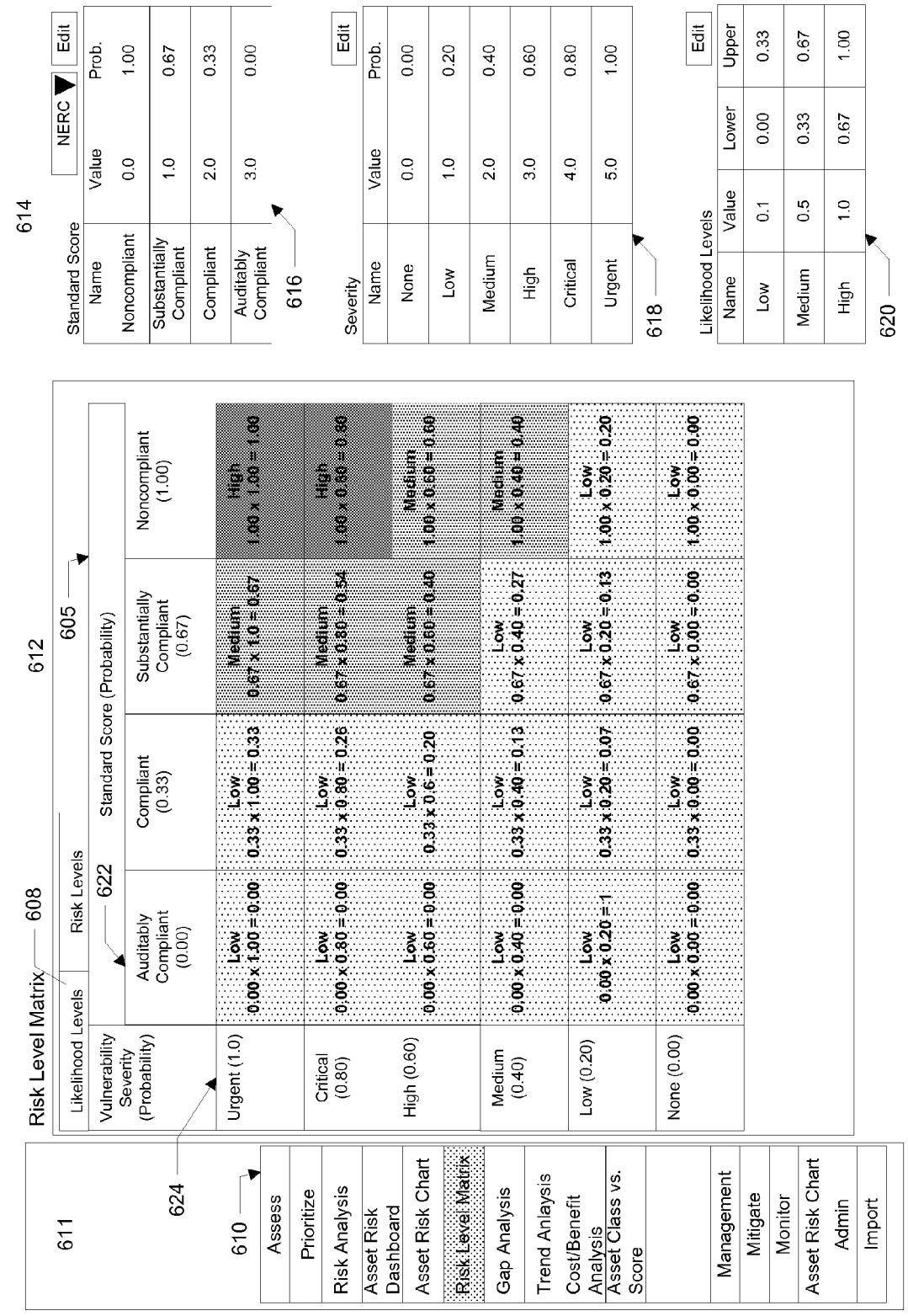
FIG. 6 shows a computer screen displaying an application window of a specific implementation a likelihood matrix.

FIG. 6 shows a computer screen displaying an application window that shows a specific implementation a risk level matrix 605 with a likelihood levels configuration tab 608 selected. The risk level matrix may be referred to as a risk level heat map. The risk level matrix is displayed when the user selects an option (e.g., risk level matrix) from a menu bar 610 positioned within a first portion of the screen 611. A second portion of the screen 612 includes the risk level matrix. A third portion of the screen 614 includes a set of user-adjustable options or widgets that may be used to input the likelihood configuration options. The second portion is between the first and third portions.

Some examples of menu options or categories that may be listed in the menu bar include assess, prioritize, management, mitigate, monitor, asset risk chart, administration, and import. A list of subcategories or sub-options may be included within a category. For example, the prioritize option or category includes the subcategories risk analysis, asset risk dashboard, asset risk chart, risk level matrix, gap analysis, trend analysis, cost/benefit analysis, and asset classification versus score.

Within the third portion of the screen, there is a standard score widget 616, a severity widget 618, and a likelihood level widget 620. Each of these widgets includes an edit button for the user to adjust or change the information in the widget, i.e., change the likelihood configuration options. When the information in the widget is changed the risk level matrix is updated to reflect the change.

The risk level matrix includes a grid, a first axis or row 622 running horizontally along a top side of the grid, and a second axis or column 624 running vertically along a left-hand side of the grid.

The row includes a set of score measurements from a selected security standard. In this specific implementation, the selected security standard is the North American Electric Reliability Corporation (NERC). This security standard includes as score measurements auditably compliant, compliant, substantially compliant, and noncompliant.

The score measurements are mapped to a first set of probabilities or numbers. That is each score measurement is mapped to one probability in the first set of probabilities. For example, auditably compliant is mapped to a probability of 0.00, compliant is mapped to a probability of 0.33, substantially compliant is mapped to a probability of 0.67, and noncompliant is mapped to a probability of 1.00.

The standard score widget allows the user to edit these probabilities. For example, in a specific implementation, the user selects the edit button. After selecting the edit button the widget (e.g., standard score widget) shows the values in the widget in editable input boxes. The user can place the cursor in the editable input boxes and change the values. A save button, which may appear when the edit button is clicked or when changes are made to values, allows the user to save any changes. There may also be an undo button to undo any change (e.g., undo any changes made since the last save).

The column includes a set of severity measurements. In this specific implementation, the severity measurements include urgent, critical, high, medium, low, and none. The severity measurements are mapped to a second set of probabilities or numbers. That is each severity measurement is mapped to one probability in the second set of probabilities. For example, urgent is mapped to 1.0, critical is mapped to 0.80, high is mapped to 0.60, medium is mapped to 0.40, low is mapped to 0.20, and none is mapped to 0.00. The severity widget allows the user to edit these probabilities.

The grid includes various colored regions. This grid includes three colored regions which are indicated by the different fill patterns in the figure. A grid can include any number of colored regions. In this specific implementation, the colored regions indicate areas of high, medium, or low likelihoods. For example, a first colored region colored a first color (e.g., red) indicates an area of high likelihood. A second colored region colored a second color (e.g., yellow) indicates an area of medium likelihood. A third colored region colored a third color (e.g., green) indicates an area of low likelihood. In another implementation, the colored regions indicate areas of high, medium, or low risk.

The grid is an N×M grid where N is the number of score measurements and M is the number of severity measurements. Typically, the number of score measurements is based on the selected standard. However, the number of score measurements, severity measurements, or both can be configured by the user. Thus, N and M can be any number. In a specific implementation, there are 4 score measurements and 6 severity measurements to define a 4×6 grid having 24 boxes.

Each box can include a label, a visual indicator, or both. The label may include text, numbers, symbols, or combinations of these. In a specific implementation, the visual indicator is a color. However, the visual indicator can include different hues, patterns, shapes, pictures, icons, or combinations of these.

In a specific implementation, the label and visual indicator (e.g., color) of a box indicates a calculated risk or likelihood level. In this specific implementation, the label high and the color red indicates there is a high likelihood of an event occurring. The label medium and the color yellow indicates there is a medium likelihood of the event occurring. The label low and the color green indicates there is a low likelihood of the event occurring. The likelihood high, medium, and low threshold ranges can be configured by the user. In this specific implementation, the grid is configured or laid out so that moving from the leftmost and lowermost box to the upper rightmost box indicates an increasing amount of risk. That is, the risk progresses from low to medium to high as one progresses from the bottom left-hand corner of the grid to the upper right-hand corner of the grid.

However, it should be appreciated that the configuration of the grid may be different from what is shown. For example, the gird may be configured opposite from what is shown. That is, the risk progresses from low to medium to high as one progresses from the upper right-hand corner of the grid to the lower left-hand corner of the grid.

Likelihood may be calculated by multiplying a criticality of vulnerability score by an effectiveness of controls score. In this specific implementation, the criticality of vulnerability score is based on third party network scanners, CVE score, or both. The effectiveness of controls score is based on an assessment score of the asset.

In a specific implementation, there is software or executable code associated with the report or risk level matrix. The associated code allows the user to interact with the report to manipulate the display of information provided. For example, in this specific implementation, the report is presented on a computer screen (e.g., computer display or electronic display). The user can use a mouse or other device (e.g., finger, light pen, or stylus) to interact with the report. The report may be displayed on a touchscreen or other electronic visual output that can detect the presence and location of a touch (e.g., a touch from the user's finger) within the display area.

In this specific implementation, the user can select any one of the boxes to see additional or detail information. For example, the user can use the pointing device (e.g., mouse) to position the mouse cursor over a box. The user selects the box by clicking the mouse button. In a specific implementation, the system responds by displaying a dialog box. The dialog box may or may not overlay the matrix. In another implementation, the system responds by displaying a window with the detail information. The user can "drill down" into a specific business unit, subnet, or individual asset to modify the likelihood score, values used to calculate the likelihood score, or both.

Figure 8:
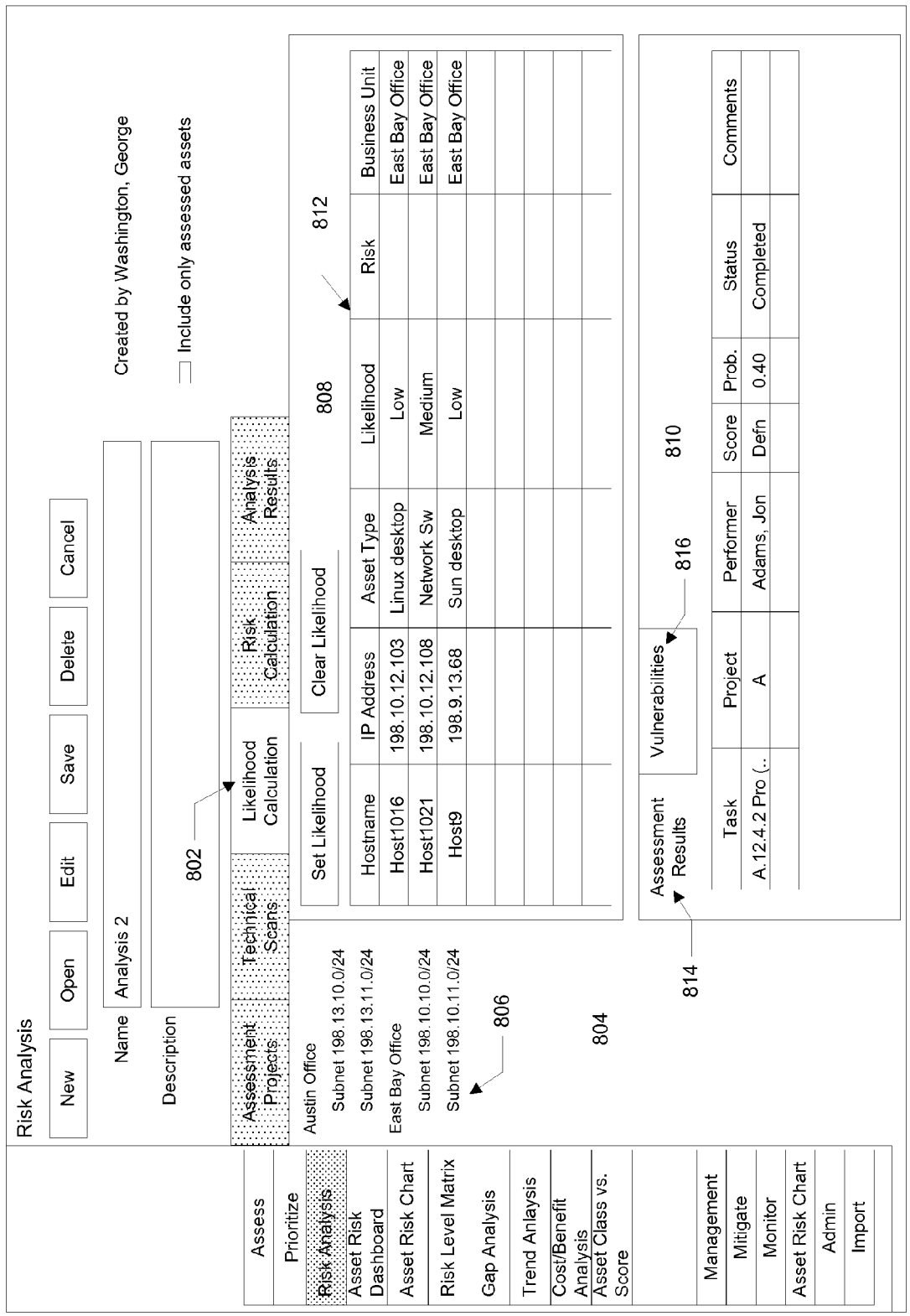
FIG. 8 shows a computer screen displaying an application window of a specific implementation of a likelihood calculation tab.
Figure 9:
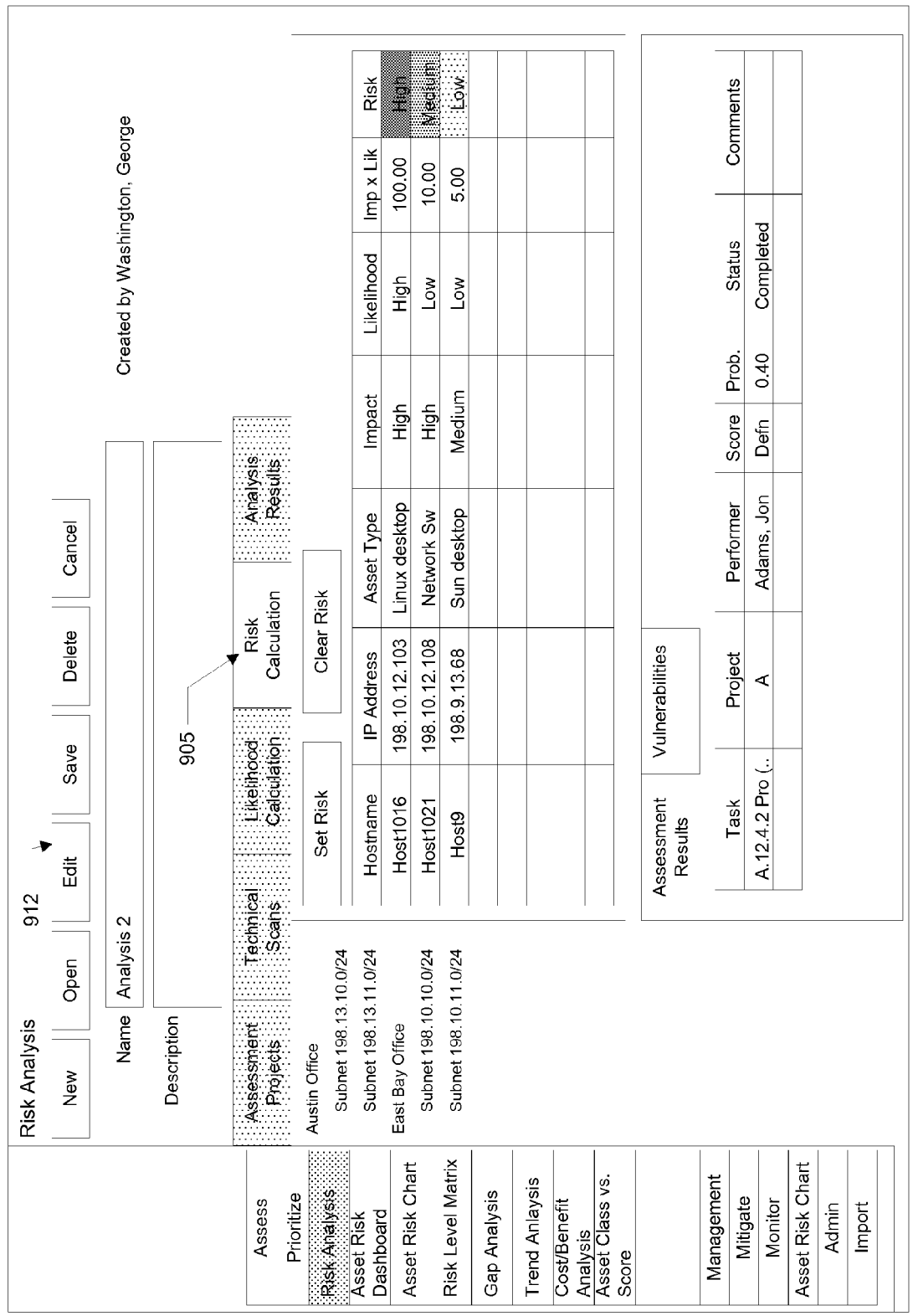
FIG. 9 shows a computer screen displaying an application window of a specific implementation of a risk calculation tab.

The detail information may include data used in the likelihood calculations such as shown in FIG. 8. The detail information may instead or additionally include data used in the risk calculations such as shown in FIG. 9.

Figure 7:
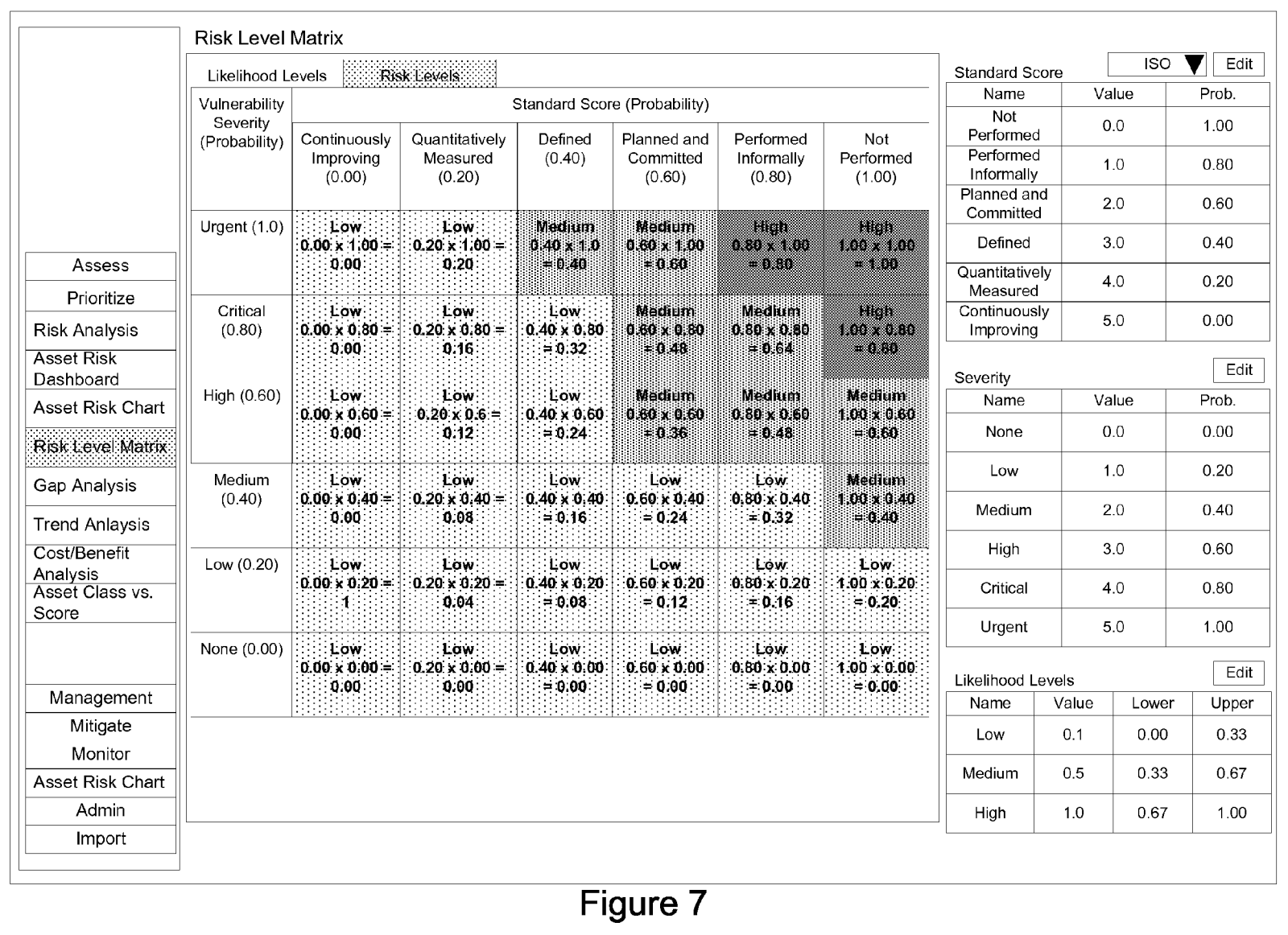

FIG. 7 shows a computer screen displaying an application window that shows another specific implementation of a risk level matrix. This matrix is similar to the matrix shown in FIG. 6, but includes a set of score measurements from the ISO security standard. In this example, the user has selected the ISO security standard from the standard score widget. Thus, the matrix is updated to reflect the set of score measurements associated with the ISO security standard: continuously improving, quantitatively measured, defined, planned and committed, performed informally, and not performed.

FIG. 8 shows a computer screen displaying an application window of a specific implementation of a likelihood calculation tab 802. The tab includes a first portion or pane 804 including a folder tree 806. A first level of the tree includes business units. A second level of the tree includes assets within a business unit. The tab includes a second portion 808 and a third portion 810 below the second portion.

The second portion includes a table 812 showing asset information. Columns of the table include hostname, IP address, asset type, likelihood, risk, and business unit. The user can use the set likelihood button, edit button, or both to input or override the likelihood values for each of the assets. In a specific implementation, there is a box for the user to input notes or comments on why the likelihood score was changed.

The third portion includes an assessment results 814 and vulnerabilities tab 816. The assessment results tab includes a table displaying the assessment results of the asset. The vulnerabilities tab includes a list of vulnerabilities from any technical scans.

FIG. 9 shows a computer screen displaying an application window that shows a specific implementation of a risk calculation tab 905. A portion of the risk calculation tab includes a table 910 having columns similar to the table in FIG. 8. But this table includes columns to show the impact, risk calculation, and risk score for the assets. The values in the impact and risk column can be overridden using edit button 912. Thus, the user can set specific security risk tolerance levels which may be different for each company.

The table cells displaying the risk score are highlighted or colored to indicate the calculated risk score or level.

Figure 10:
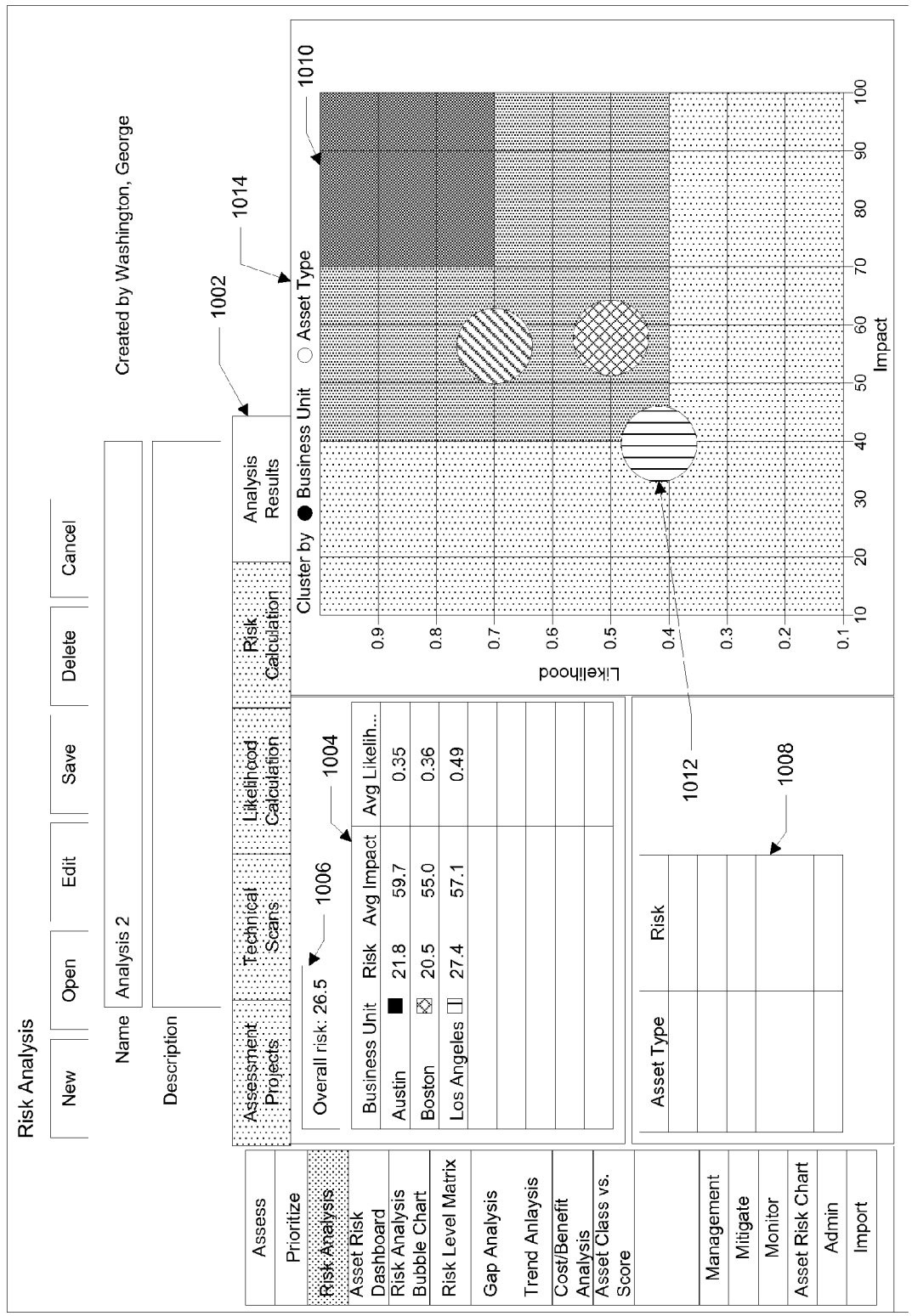
FIG. 10 shows a computer screen displaying an application window of a specific implementation of an analysis results tab.

FIG. 10 shows a computer screen displaying an application window that shows a specific implementation of an analysis results tab 1002. A first portion of the tab pane includes a table 1004 listing various business units. Each business unit is associated with a risk score, an average impact, and an average likelihood. A box displays an overall risk 1006 (i.e., quantitative risk exposure score) or average risk score of the business units.

A second portion of the tab pane includes a table 1008 summarizing the asset types and for each asset type a risk associated with the asset type.

A third portion of the tab pane includes a risk heat map 1010. In this specific implementation, the risk heat map includes an N×M grid where N and M are 9 (i.e., a 9×9 grid). However, N and M can be any number. An x-axis of the grid includes a measurement of impacts. A y-axis of the grid includes a measurement of likelihoods. Bubbles or circles 1012 may be superimposed over the risk heat map and may be animated to show how risk is trending.

The bubbles can indicate business units or asset types depending upon which clustering option 1014 the user selects.

Each of the grid boxes or squares are colored. The colors indicated the risk level associated with a box.

The user can review the risk heat map and the position of the bubbles on the risk heat map to see how much risk or the level of risk that is associated with a specific business unit or asset type.

Figure 11:
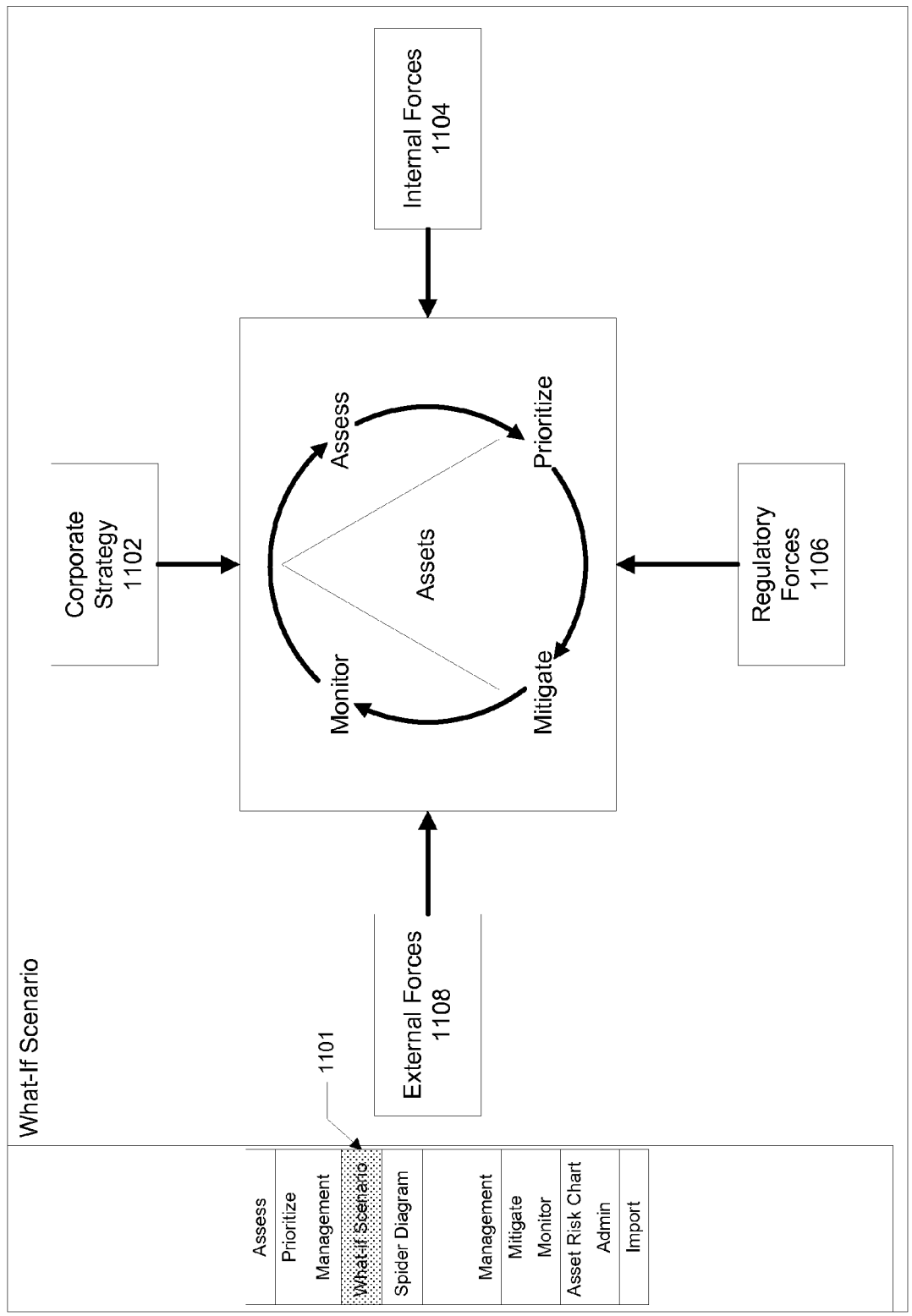
FIG. 11 shows a computer screen displaying an application window of a specific implementation of a tool for what-if scenario modeling.

FIG. 11 shows a computer screen displaying an application window that shows a specific implementation of a tool for what-if scenario modeling. The tool may be accessed by selecting an option "what-if scenario" 1101 from the menu bar.

The tool includes the four forces impacting the security lifecycle or security framework. A first force 1102 includes corporate strategy. A second force 1104 includes internal forces. A third force 1106 includes regulatory forces. A fourth force 1108 includes external forces.

Forces such as causes, catalysts, events, and the like can result in a change in the security controls. Corporate strategy or business drivers include the company's future goals, activities, and objectives. An example of this force is the corporate strategy to expand products into new markets and countries. The user can use the system to develop a scenario to plan for security concerns, infrastructure, costs, and the like to support the strategy.

Internal forces include changes in company operations such as information technology (IT) infrastructure upgrades, deployment of new technologies, and business requirements.

Regulatory forces include government and other regulatory agencies that impose security requirements. Examples include SOX, PCI, and GLBA.

External forces include the influence and changes to security from outside the company. Examples include hackers, computer viruses, and natural disasters.

The user can customize the model. For example, the user can click a button "add force" to add another or fifth force, click a button "delete force" to delete a force, click a button "rename force" to rename a force, and so forth.

One of more of these forces may impact one or more of the asset, assessment, prioritize (risk), and mitigation modules. For example, with respect to the asset module forces may change a business unit or a unit's classification of its assets. For example, the corporate strategy may require divesture of some business units and therefore the security resources and services to protect those assets will no longer be required.

With reference to the assessment module, the target score for the assessments may change as a result of new external threats. For example, a network firewall was deemed sufficient but since they do not protect Web browsing an additional application firewall is required.

With reference to the prioritize (risk) module, changes in the IT environment may introduce new vulnerabilities and thereby increasing the risk factors (assuming all other variables such as controls and probability stays the same).

With reference to the mitigate module, mitigation priorities may change or project completion dates may be extended if security budgets are cut.

In a specific implementation, a flow for creating a "what-if scenario" is:

1. Select "what-if scenario" option from menu bar.
2. Select one or more forces and make assumptions about conditions associated with the selected force.
3. Calculate risk exposure based on the "what if" conditions.
4. Save "what if" scenario.

The forces of the tool may be implemented as buttons or selectable objects. The user creates a scenario or model by clicking on one of the forces and selecting an assessment project having actual scores to override or tweak. The user can then enter a description of the scenario or model. Fields can include the following information:

1. Scenario name and other basic information such as date created, modified, author, and so forth.
2. Description of scenario and force (or forces). It should be appreciated that one or more forces can impact the scenario. A model may be defined as a number of scenarios generated by the user to forecast risk, controls, vulnerabilities and other security criteria based on the impact of future forces. A scenario may be defined as the impact of a single force to the control framework. For example, the external force of a future computer virus that exploits vulnerabilities will increase the likelihood of security incidents and costs. A force may be defined as a category of event or decision in the future that will change the effectiveness of security controls, vulnerabilities, other criteria, and any combination of these.

3. Impact to control framework (e.g. standards). Table F below shows an example of a COBIT framework with current and target scores to be modified.

TABLE F

| Ref. No. | Name | Requirement | Current Score | Target Score | References |
|---|---|---|---|---|---|
| 1 | Control Environment Considerations | | | | |
| 1.1 | IT Strategic Planning | | | | |
| 1.1.1 | Alignment with Business Objectives | Has management prepared strategic plans for IT that aligns business objectives with IT strategies? Does the planning approach include mechanisms to solicit input from relevant internal and external stake holders affected by the IT strategic plans? | 3 | 4 | CoBiT 4.0 Reference: PO1.4 |
| 1.1.2 | Communication of IT Plans | Does the IT organization communicate its IT plans to business process owners and other relevant parties across the organization? | | | |

In a specific implementation, changes in security variables such as vulnerabilities, asset classification, and risk can be defined in a spreadsheet. The spreadsheet can be imported into the system. The system can track variables and the user can modify, add, and delete variables.

Users may also customize the security standards mapping matrix. The system generates management graphs to show the change or delta in standards (or control) framework. The user can use the system to leverage historical data, enter estimates, or both for variables.

In a specific implementation, the system provides a wizard similar to the scenario manager. The wizard provides a graphical user interface (GUI) that steps the user through the process of creating a scenario or model. Various steps of the wizard allow the user to tweak the assumptions and scores.

The manager module may integrate with other modules of the system. An example of integration is with quantifying risk in the prioritization module. Table G below shows an example of some of the variables or parameters than can be changed to create a what-if scenario.

TABLE G

| Variable | Description |
|---|---|
| asset classification | User can increase or decrease asset classification value. |
| threat | Entered by user, linked with third party security intelligence companies, or both. |
| vulner- | Entered by user, linked with tech scanning tools, or both. |

TABLE G-continued

| Variable | Description |
| --- | --- |
| ability | New vulnerabilities can be entered. Old vulnerabilities can be marked as fixed or unfixed. |
| controls | Entered by user, identify whether new controls implemented; identify whether current controls outdated or removed. |
| probability of occurrence | Entered by user, includes an estimate based on the threat, vulnerabilities, and controls. May be quantified-qualitative will result in clustering of averages, calculations, or both. |
| impact | Entered by user, includes consolidation of operational and business impacts that are quantified in dollar loss. |
| risk | Calculated by system. System calculates risk based any number of variables, such as one of or more of the variables listed above. In a specific implementation, the default risk model follows NIST guidelines. |

The result or output of the analysis enables the user to ask and answer the following:

1. How will the forces change my control framework? For example, will the forces reduce the effectiveness of security controls? Or will they require additional controls (e.g. increased security)?

2. How do the forces change my risk levels? Will my risk increase or decrease for specific business units or the overall company?

3. What are the business impacts that can be reasonably assumed based on historical business and security metrics? For example, will the impact of force(s) potentially increase the number of security breaches? What is the historical cost of those breaches? Can we calculate an estimate for security return on investment (ROI)?

4. Based on the information and analysis, can we develop a two or three year security roadmap based on the anticipated forces?

The results and output from this analysis are generated in a report format that can be easily visualized.

Figure 12:
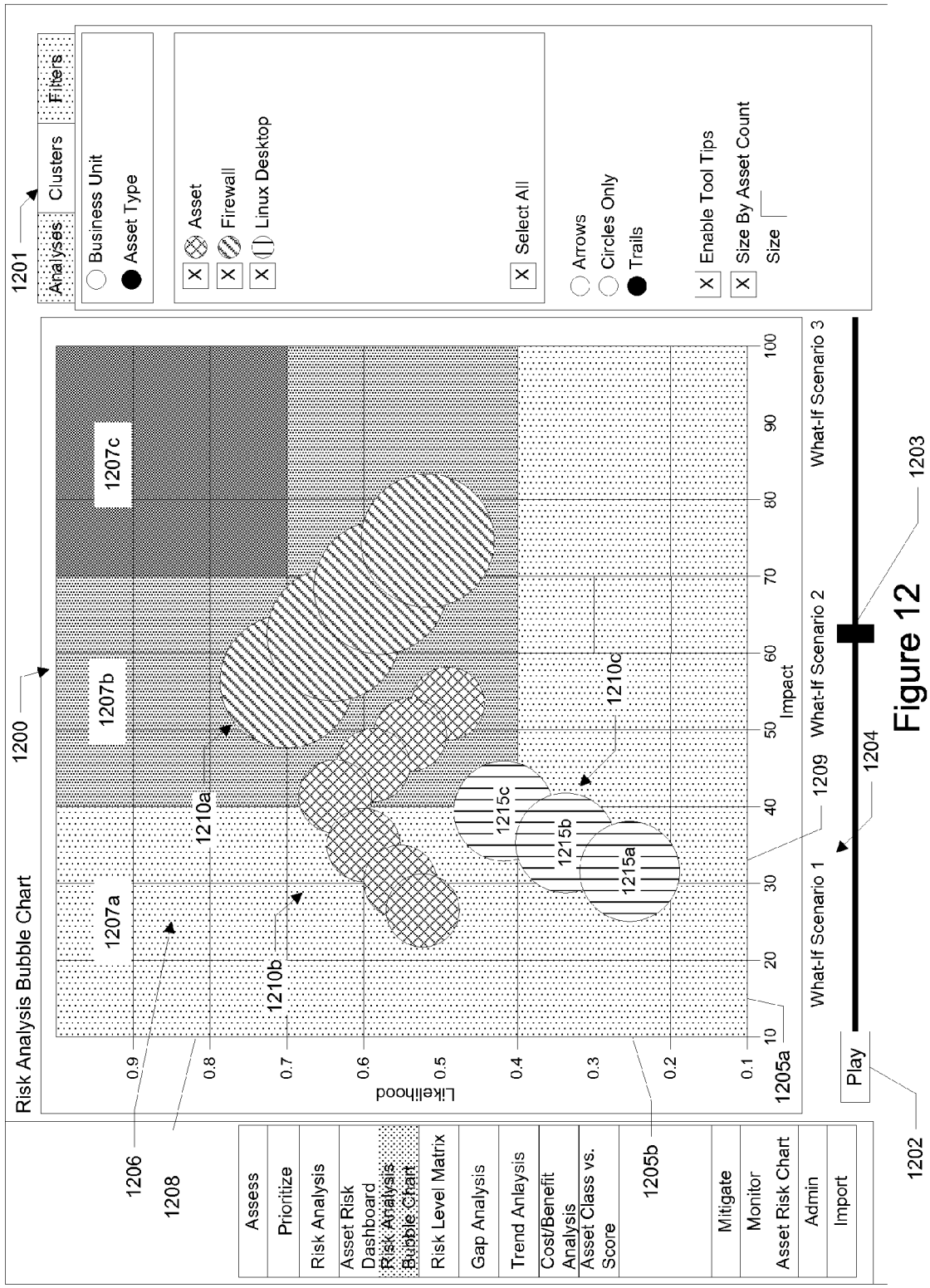
FIG. 12 shows a computer screen displaying an application window showing a specific implementation of an animated risk heat map bubble chart.

FIG. 12 shows a computer screen displaying an application window showing a specific implementation of an animated risk heat map bubble chart or graph 1200. The chart is displayed in a first portion of the screen. A second portion of the screen includes a set of user-adjustable options 1201. The chart includes a grid. The grid is similar to the gird shown in FIGS. 6-7 and 10 and described above. In this implementation, there is a play button 1202 and slider 1203 at the bottom of the grid. A portion of the screen above the play button and slider indicates the what-if scenarios 1204 that are being animated.

The graph includes first and second axes 1205a and 1205b, respectively, and a background 1206. In this specific implementation, the first axis represents a likelihood scale. The second axis represents an impact scale. The axes intersect at an origin. Moving from the origin, along the impact scale, and towards an end of the impact scale opposite the origin indicates increasing levels of impact or disruption to the organization if the asset becomes compromised because of an event occurring (e.g., malware infection, security breach, theft, denial of service, or firewall penetration). Moving from the origin, along the likelihood scale, and towards an end of the likelihood scale opposite the origin indicates increasing levels of likelihood or increasing levels of probability that an event causing disruption will occur.

The background includes first, second, and third regions 1207a, 1207b, and 1207c, respectively. Each region is associated with a particular visual representation which is shown in the figure as shading or a fill pattern. In a specific implementation, the visual representation is a color, but may instead or additionally be a pattern, texture, or combinations of these. In this specific implementation, region 1207a is shown in a first color. Region 1207b is shown in a second color, different from the first color. Region 1207c is shown in a third color, different from the first and second colors. The regions, via their associated visual representations or colors, are used to indicate levels of risk.

In this specific implementation, the first color of the first region is green to indicate low risk. The second color of the second region is yellow to indicate medium risk. The third color of the third region is red to indicate high risk. In other words, in this specific implementation, a background color of the region is nonwhite or not white. In another implementation, the background color may be white.

Although the figure shows three regions, there can be any number of regions depending upon the number of discrete risk exposure levels the user desires. For example, there can be a region to indicate low-to-medium risk. A region to indicate medium-to-high risk and so forth. Further, each region may not necessarily be shown as a distinct color with clearly defined edges or borders. For example, instead of distinct regions of color, there can be a color gradation so that green fades into yellow and yellow fades into red.

Thus, as can be seen in this specific implementation of the graph, the left and bottom portions of the graph (or first region) indicate areas of low risk. The middle portion of the graph (or second region) indicates areas of medium risk. The upper rightmost portion of the graph (or third region) indicate areas of high risk.

More specifically, in this specific implementation, a leftmost edge 1208 of the first region abuts or touches the first axis. A bottommost edge 1209 of the first region abuts or touches the second axis. In another implementation, the leftmost edge, bottommost edge, or both of the first region do not touch an axis. An edge of the first region may be near an axis but not touch an axis. For example, there may be a gap between an axis and a first edge of the first region. In this specific implementation, a first shortest distance between the first axis and a first edge of the first region is from the first axis to the leftmost edge of the first region. A second shortest distance between the second axis and a second edge of the first region is from the second axis to the bottommost edge. The first region is between the second region and the first and second axes. The second region is between the first and third regions.

First, second, and third set of bubbles 1210a, 1210b, and 1210c overlay the grid or are superimposed over one or more regions of the grid or graph. These sets of bubbles may indicate clusters of assets by asset type or clusters of assets by business unit. These bubbles can be clicked on or otherwise selected to see additional or detail information. For example, clicking on a bubble can open a new window or dialog box showing the specific assets represented by the bubble, the assessment scores of the assets, the risk calculation formulas, and so forth.

Each set of bubbles includes a set of overlapping bubbles. The overlapping bubbles are drawn one at a time or sequentially (e.g., one after the other) which gives the appearance of animation. Thus, when the play button is clicked, the bubbles will appear to be moving around the grid. The movement of the bubbles indicate changes in the quantitative risk exposure score of the assets represented by the bubbles. The position of the bubbles on the grid indicate the risk exposure score of the assets at a specific point in time or the risk exposure score of a hypothetical or what-if scenario.

In a specific implementation, this chart is used to compare a baseline scenario with one or more what-if scenarios or compare one what-if scenario to another what-if scenario. For example, let us assume that the user wishes to compare the baseline scenario with a what-if scenario. The baseline scenario includes an actual or existing risk score or exposure for a group of assets. The what-if scenario includes a forecasted or future risk score for the group of assets.

When the play button is clicked, a first bubble 1215a in the third set of bubbles is drawn at a first position on the grid. The first position of the first bubble indicates the actual risk score. As shown by the first position of the first bubble, the risk of the group of assets is low because the first bubble is within a region of low risk.

As the play or animation continues, a second bubble 1215b is drawn at a second position on the grid. Then a third bubble 1215c is drawn at a third position on the gird. The third bubble indicates the forecasted risk score of the what-if scenario. As shown by the third position of the third bubble, the risk of the group of assets is moderate because the third bubble is overlapping a region of medium risk and a region of low risk.

The positions of the second and third bubbles thus indicate a trend towards more risk, i.e., a trend from low risk towards medium risk. Perhaps, for example, the what-if scenario includes budget cuts which are adversely affecting the resources used to secure the assets. Thus, depending on where and how the bubbles move, the bubbles can show whether risk for a group of assets is increasing, decreasing, or staying constant. The direction in which the bubbles move can help the user see and understand the direction in which risk is trending, i.e., is the organization trending towards more risk based on the hypothetical scenario?, is the organization trending towards less risk based on the hypothetical scenario?, and so forth.

That is, a slope of the line connecting two more bubbles can indicate an increase in risk, a decrease in risk, or no change in risk. For example, a line drawn from a first drawn (or first appearing bubble, i.e., an initial bubble) to a finally drawn (i.e., a final bubble) can have a positive slope or a negative slope. A positive slope is a slope that rises up left to right. A positive slope can indicate an increasing amount of risk. A negative slope falls left to right. A negative slope can indicate a decreasing amount of risk.

The different background colors of the graph help the user to visually quantify or qualify the level of risk. For example, if a bubble appears or is superimposed over a green region of color this can be described as or indicate low risk exposure. If the bubble is superimposed over a yellow region of color this can indicate a medium risk exposure. If the bubble is superimposed over a red region of color this can indicate a high risk exposure.

The position of the bubble within a region of color, relative to other regions of color, can also help to quantify or qualify the level of risk. For example, if a bubble in the yellow region is closer to the red color region than the green color region, this can be described as medium-high risk exposure. If the bubble in the yellow region is closer to the green color region than the red color region, this can be described as medium-low risk exposure.

In this specific implementation, an area of the first region is greater than an area of the second region and an area of the third region. The area of the second region is greater than an area of the third region. This configuration or layout of the graph can be described as one in which there are more configurations for low risk exposure as compared to configurations with medium or high risk exposure.

However, this is not always the case. For example, it may be the case that there are more configurations for high risk exposure as compared to configurations for low risk exposure. If this is the case, the area of the third region indicating high risk may be greater than the area of the first region indicating low risk. Whether there are more configurations of low risk exposure as compared to configurations of high risk exposure can depend upon the risk tolerance level of the organization or company. For example, risk adverse organizations (e.g., nuclear power plants) may have a smaller number of configurations that they consider low risk as compared to less risk adverse organizations. Thus, in various implementations, the areas of the first, second, and third regions are the same. At least one area is different from the remaining areas. An area of the third region may be greater than an area of the second region and the first region. An area of the second region may be greater than an area of the first region.

In a specific implementation, the color of the regions or background color does not change and remains constant as the bubbles are animated. In other implementation, the color of one or more of the regions changes while the bubbles are animated.

FIG. 12 shows the background regions of color as polygonal shapes, i.e., shapes having straight line segments or edges. In this specific implementation, each edge of a region is parallel to one of the first or second axes and perpendicular to the other of the first or second axes. Conversely, each edge of a region is perpendicular to one of the first or second axes and parallel to the other of the first or second axis.

However, in other implementations, one or more background regions of color may have diagonal or slanted line segments, curved line segments, or both. The line segments may be described as asymptotic or hyperbolic. Curved line segments of the risk regions can indicate a nonlinear risk exposure relationship between impact and likelihood (e.g., exponential or logarithmic relationships). For example, it may be the case that an increase in likelihood corresponds to a nonlinear increase in risk exposure.

In a specific implementation, an interactive or management report such as the report shown in FIG. 12 includes a set of filters which the user can select to filter the information (i.e., show some information and hide other information). Some examples of filters include filters based on asset type, filters based on business units, filters based on geographic location, filters based on asset classifications, filters based on likelihood evaluations, filters based on impact evaluations, filters based on risk scores, and so forth. For example, a first set of animated bubbles may represent assets of a first type (e.g., workstations). A user can select or deselect a filter to see or hide a second set of animated bubbles that represent assets of a second type (e.g., portable computers). If, for example, the filter to hide assets of the second type is selected, the second set of animated bubbles will not be shown on the graph.

Figure 13:
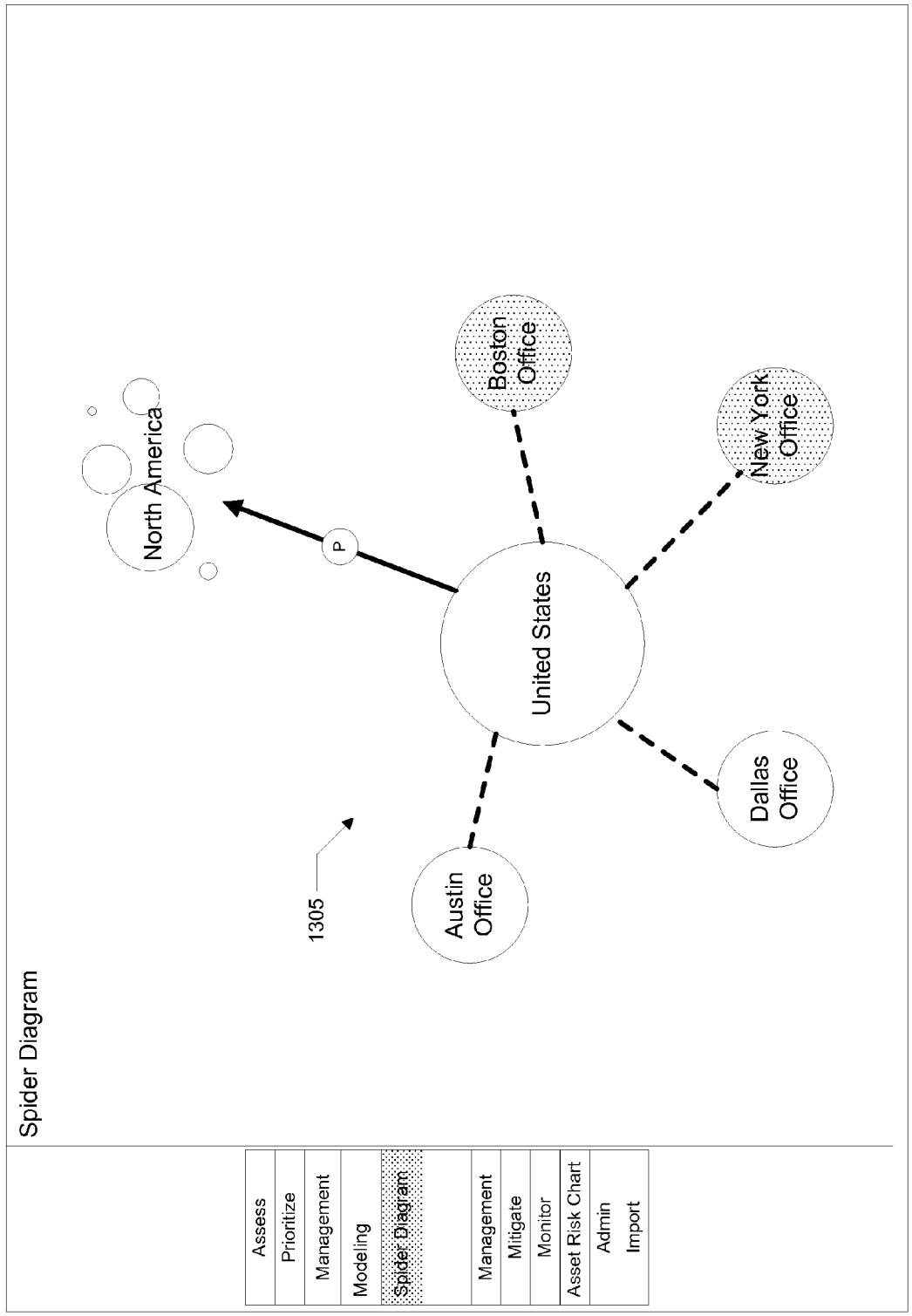
FIG. 13 shows a computer screen displaying an application window showing a specific implementation of an animated spider diagram.

FIG. 13 shows a computer screen displaying an application window that shows a specific implementation of an animated spider diagram 1305. In a specific implementation, the diagram shows relationships between two more entities. For example, asset information can be linked with business and security metrics. In this specific implementation, the asset will be the "anchor" that "links" the business units, assessment results, vulnerabilities, risks, asset classification, cost to mitigate, and so forth.

The diagram represents business units, IP addresses, and other security metrics that are tied to the asset. The lines between the circles can represent the relationships between the data. The lines may be colored lines to indicate relationship types. For example, a yellow line with a "P" may denote a parent-child relationship. Additionally, highlighting the circles may be used to indicate whether or not action is required. For example, a blue circle can represent mitigation, approval, or other high priority tasks.

A similar diagram may be used to show how standards (e.g., CoBIT) are mapped to other compliance and industry best practices.

Figure 14:
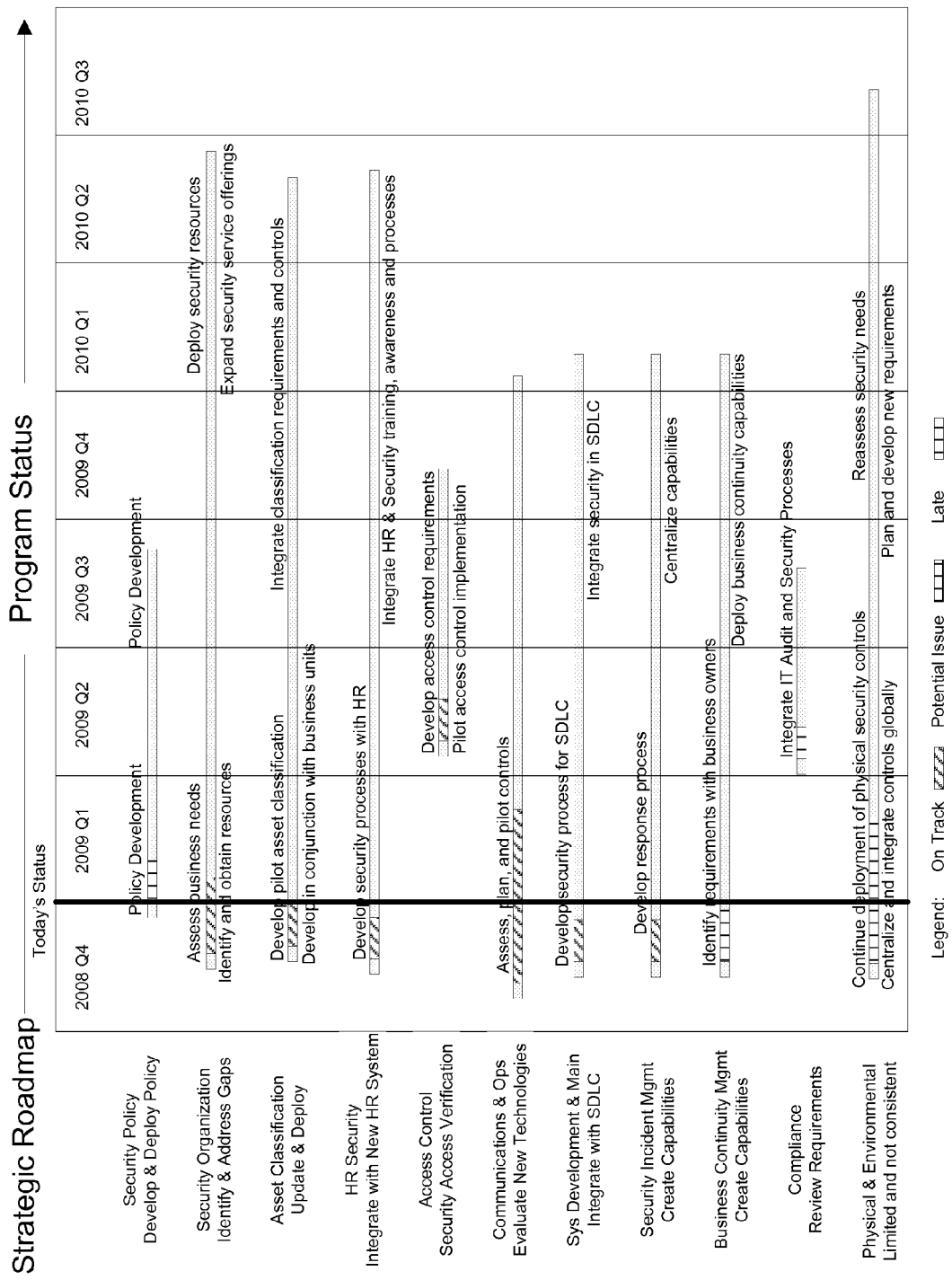
FIG. 14 shows a computer screen displaying an application window of a specific implementation a security roadmap.

FIG. 14 shows a computer screen displaying an application window of a specific implementation of a security roadmap. The roadmap shows one or more security projects (e.g., assessment or mitigation projects) over the course of a period of time. Each bar is a visual representation of the project duration and status. The data can be imported from other project management applications such as Microsoft Project.

A "Today's Status" reference line reflects the current data and week. Project information can be entered and tracked similar to tasks from the mitigation or assessment modules. For example, project information can be entered using Web based entry forms.

This chart represents a roadmap in terms of tasks and projects. The user is able to change the view to reflect budget (e.g., forecast spending by type of costs per quarter), assessment versus mitigation tasks, business units, and other filters. Each project, business unit, or other grouping that each colored bar represents includes summary information that is shown when the mouse (or mouse cursor) hovers over the bar. Clicking (e.g., double clicking) the bar opens up a drill down view of individual tasks, status, and other information.

Figure 15:
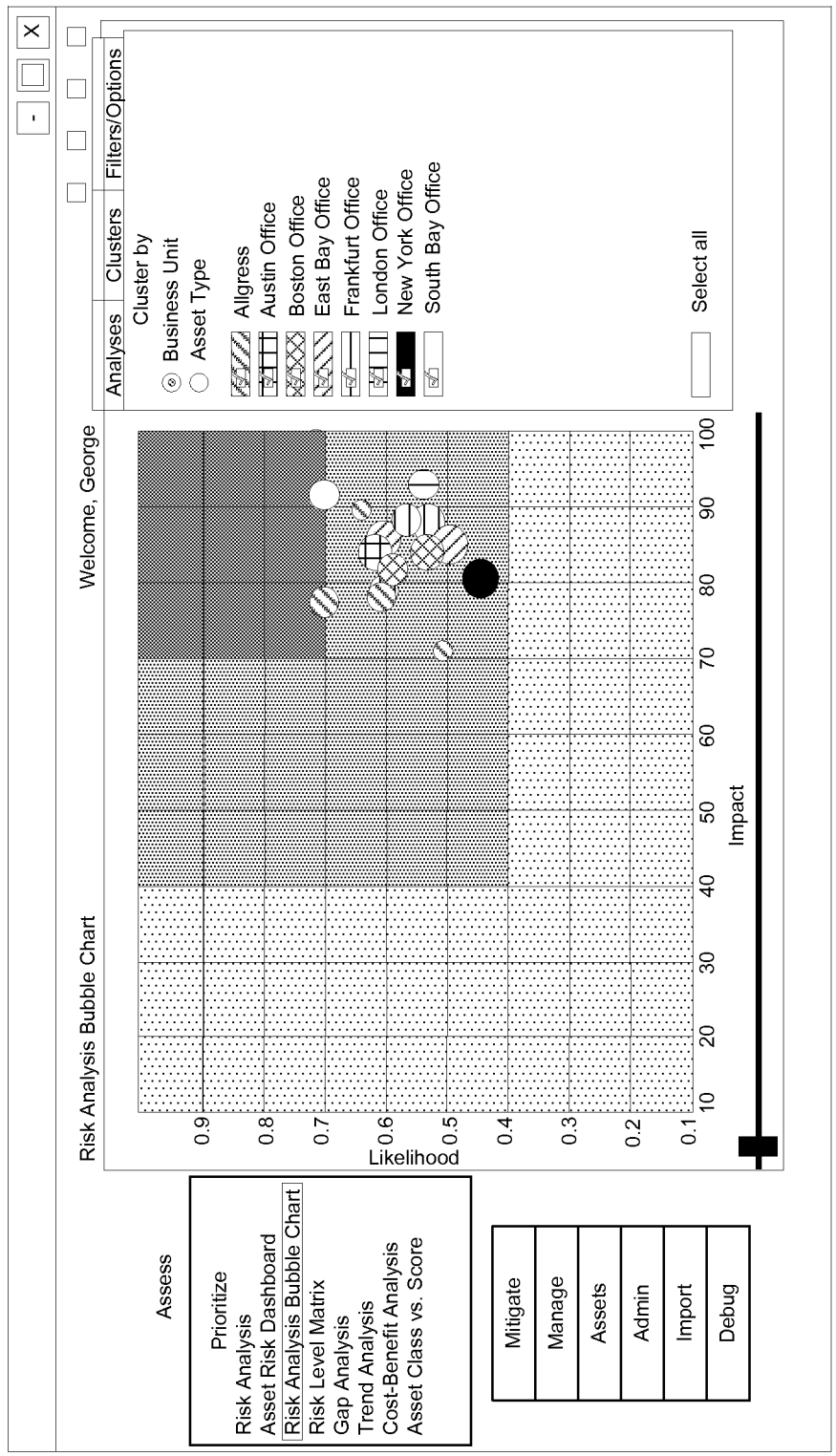
FIGS. 15-16 show various implementations of interactive graphs.

FIG. 15 shows a specific implementation of an animated chart for a management report of the risk module. In this specific implementation, an x-axis 1502 of the graph represents the likelihood and a y-axis 1504 represents the impact. Animated visual representations 1506 represent the business units and the average risk score of all assets within that business unit. In this specific implementation, the animated visual representations are circles or bubbles, but can be implemented using other shapes or images (e.g., squares, rectangles, triangles, and ovals). The bubbles may instead or additionally represent technology types, asset types, or other categories based on criteria selected by the user.

The bubbles may behave similar to the other animated charts and management reports discussed in this application where a "drill down" functionality is available. For example, the user can double click the bubble and view the detailed data contributing to the location and size of the bubble.

The report further includes a play button that allows the bubbles to be animated to represent the changes in risk over a period of time. This functionality may be similar to the cost/benefit chart.

Figure 16:
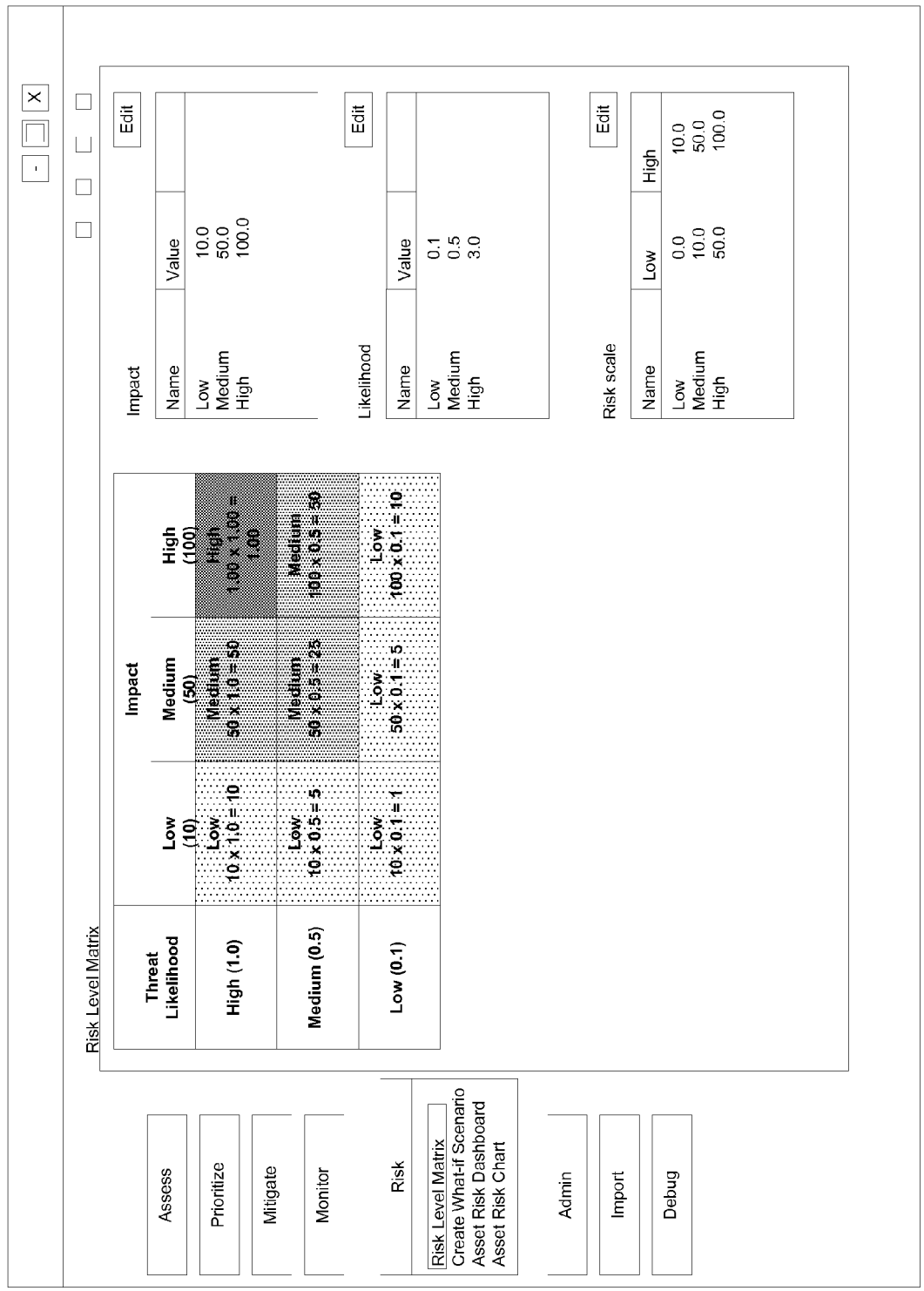

FIG. 16 shows a specific implementation of a risk level matrix report and risk configuration options. The report is configurable so that the user can change the risk, likelihood, and impact thresholds if desired.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   in a computer screen, providing a first portion of the screen with a plurality of user-adjustable options, wherein the plurality of user-adjustable options includes an impact value and a likelihood value;
   in the computer screen, providing a second portion of the screen with a graph having a first axis, a second axis, and a background comprising a first region having a first color and a second region having a second color, different from the first color,
   wherein a first shortest distance between the first axis and a first edge of the first region is from the first axis to a leftmost edge of the first region, a second shortest distance between the second axis and a second edge of the first region is from the second axis to a bottommost edge of the first region, and the first region is between the second region and first and second axes; and
   after a first user-selectable option is selected, animating a first plurality of visual representations in the graph, wherein the graph comprises:
   (a) a first axis and a second axis, wherein the first axis corresponding to the impact value and the second axis corresponding to the likelihood value;
   (b) an initial visual representation indicates the first data point, a final visual representation indicates the second data point, wherein a line drawn from the initial visual representation to the final visual representation that has a positive slope indicates an increasing amount of risk; and
   (c) a background comprising a first region having a first color and a second region having a second color, different from the first color,
   wherein when the initial visual representation is superimposed over the first region having the first color and the final visual representation is superimposed over the second region having the second color, the organization's risk exposure has increased, and
   when the initial visual representation is superimposed over the second region having the second color and the final visual representation is superimposed over the first region having the first color, the organization's risk exposure has decreased.

2. The method of claim 1 wherein the leftmost edge of the first region abuts the first axis and the bottommost edge of the first region abuts the second axis.

3. The method of claim 1 wherein an area of the first region is greater than an area of the second region.

4. The method of claim 1 wherein the background comprises a third region having a third color, different from the first and second colors.

5. The method of claim 4 wherein the second region is between the first and third regions.

6. The method of claim 4 wherein each of the first plurality of visual representations comprises a circle.

7. The method of claim 1 comprising:
   upon a user selecting one of the first plurality of visual representations in the graph, displaying in the computer screen information associated with the selected visual representation.

8. The method of claim 1 wherein the first plurality of visual representations represents assets of a first type and the after a first user-selectable option is selected comprises:
   determining whether a filter to filter assets of a second type, different from the first type, has been selected;
   when it is determined the filter has not been selected, animating a second plurality of visual representations in the graph, wherein the second plurality of visual representations represents assets of the second type; and
   when it is determined the filter has been selected, not animating the second plurality of visual representations.

9. The method of claim 1 wherein the background comprises a third region having a third color, different from the second and first colors.

10. The method of claim 1 wherein the visual representations are bubbles.

11. The method of claim 1 wherein during the animating a plurality of successive visual representations in the graph, the first color of the first region remains constant.

12. The method of claim 1 wherein the animating a first plurality of visual representations in the graph comprises:
in a first computer screen, providing a first portion of the screen with a plurality of user-selectable options;
in the first computer screen, displaying a play button and a time slider bar with a time position indicator;
after a first user-selectable option and the play button is selected, animating a plurality of bubbles in the graph and animating the time position indicator to indicate a position in time on the time slider bar being displayed in the graph, wherein during the animating of the plurality of bubbles in the graph the bubbles being animated can increase or decrease in size;
allowing a user to drag the time position indicator backwards or forwards to adjust the animation of the graph backwards or forward in time; and
while the plurality of bubbles are being animated, not moving the at least one reference line from a fixed position, wherein the plurality of bubbles move in motion relative to the fixed position of the at least one reference line.

13. The method of claim 12 wherein one of the at least one reference line is a curved line.

14. The method of claim 12 wherein a first reference line of the at least one reference line is a straight line and a second reference line of the at least one reference line is a curved line.

15. The method of claim 12 comprising:
upon a user selecting one of the plurality of animated bubbles in motion at a first time step, displaying in a second screen information associated with the selected bubble at a time represented by the graph in the first time step.

16. The method of claim 15 comprising:
upon a user selecting one of the plurality of animated bubbles in motion at a second time step, subsequent to the first time step, displaying in a third screen information associated with the selected bubble at a time represented by the graph in the second time step, wherein the information in the third screen is different from the information in the second screen.

17. The method of claim 12 wherein one of the plurality of user-selectable options comprises a display trails of the bubbles option, wherein the bubbles can change in size during animation.

18. The method of claim 12 comprising:
for a first region of the graph that is a first distance range away from reference line, showing the first region using a first color; and
for a second region of the graph that is a second distance range away from reference line, showing the second region using a second color, different from the first.

19. A method comprising:
in a computer screen, providing a first portion of the screen with a plurality of user-adjustable options, wherein the plurality of user-adjustable options includes an impact value and a likelihood value;
in the computer screen, providing a second portion of the screen with a graph having a first axis, a second axis, and a background comprising a first region having a first color and a second region having a second color, different from the first color,
wherein a first shortest distance between the first axis and a first edge of the first region is from the first axis to a leftmost edge of the first region, a second shortest distance between the second axis and a second edge of the first region is from the second axis to a bottommost edge of the first region, and the first region is between the second region and first and second axes;
after a first user-selectable option is selected, animating a first plurality of visual representations in the graph, wherein the visual representations are bubbles and the graph comprises:
(a) a first axis and a second axis, wherein the first axis corresponding to the impact value and the second axis corresponding to the likelihood value;
(b) an initial visual representation indicates the first data point, a final visual representation indicates the second data point, wherein a line drawn from the initial visual representation to the final visual representation that has a positive slope indicates an increasing amount of risk; and
(c) a background comprising a first region having a first color and a second region having a second color, different from the first color,
wherein the initial visual representation can be superimposed over the first region having the first color and the final visual representation is superimposed over the second region having the second color, and
when the initial visual representation can be superimposed over the second region having the second color and the final visual representation is superimposed over the first region having the first color,
wherein the animating a first plurality of visual representations in the graph comprises:
in a first computer screen, providing a first portion of the screen with a plurality of user-selectable options,
in the first computer screen, displaying a play button and a time slider bar with a time position indicator,
after a first user-selectable option and the play button is selected, animating a plurality of bubbles in the graph and animating the time position indicator to indicate a position in time on the time slider bar being displayed in the graph, wherein during the animating of the plurality of bubbles in the graph the bubbles being animated can increase or decrease in size,
allowing a user to drag the time position indicator backwards or forwards to adjust the animation of the graph backwards or forward in time, and
while the plurality of bubbles are being animated, not moving the at least one reference line from a fixed position, wherein the plurality of bubbles move in motion relative to the fixed position of the at least one reference line; and
upon a user selecting one of the plurality of animated bubbles in motion at a first time step, displaying in a second screen information associated with the selected bubble at a time represented by the graph in the first time step.

20. A method comprising:
in a computer screen, providing a first portion of the screen with a plurality of user-adjustable options, wherein the plurality of user-adjustable options includes an first value and a second value;
in the computer screen, providing a second portion of the screen with a graph having a first axis, a second axis, and a background comprising a first region having a first color and a second region having a second color, different from the first color, wherein a first shortest distance between the first axis and a first edge of the first region is from the first axis to a leftmost edge of the first region, a second shortest distance between the second axis and a second edge of the first region is from the second axis to a bottommost edge of the first region, and the first region is between the second region and first and second axes;

after a first user-selectable option is selected, animating a first plurality of visual representations in the graph, wherein the visual representations are bubbles and the graph comprises:

(a) a first axis and a second axis, wherein the first axis corresponding to the first value and the second axis corresponding to the second value;

(b) an initial visual representation indicates the first data point, a final visual representation indicates the second data point; and (c) a background comprising a first region having a first color and a second region having a second color, different from the first color, wherein the animating a first plurality of visual representations in the graph comprises:

in a first computer screen, providing a first portion of the screen with a plurality of user-selectable options, in the first computer screen, displaying a play button and a time slider bar with a time position indicator, after a first user-selectable option and the play button is selected, animating a plurality of bubbles in the graph and animating the time position indicator to indicate a position in time on the time slider bar being displayed in the graph, wherein during the animating of the plurality of bubbles in the graph the bubbles being animated can increase or decrease in size, allowing a user to drag the time position indicator backwards or forwards to adjust the animation of the graph backwards or forward in time, and while the plurality of bubbles are being animated, not moving the at least one reference line from a fixed position, wherein the plurality of bubbles move in motion relative to the fixed position of the at least one reference line.

\* \* \* \* \*